United States Patent [19]
Noguchi

[11] Patent Number: 5,764,380
[45] Date of Patent: Jun. 9, 1998

[54] ORIGINAL-DETECTION METHOD AND DEVICE, AND ORIGINAL-PROCESSING DEVICE HAVING AN ORIGINAL-DETECTION FUNCTION

[75] Inventor: Junichi Noguchi, Yokohama, Japan

[73] Assignee: Canon Kabushiki Kaisha, Tokyo, Japan

[21] Appl. No.: 545,209

[22] Filed: Oct. 19, 1995

[30] Foreign Application Priority Data

Nov. 9, 1994 [JP] Japan .................................. 6-274861

[51] Int. Cl.$^6$ ...................................................... H04N 1/04
[52] U.S. Cl. ............................................ 358/488; 358/449
[58] Field of Search ................................... 358/449, 488, 358/514, 512, 494, 497, 401; 428/195; 250/208.1; 355/75, 311, 317, 326 R; 399/376, 370; 382/286, 291, 289

[56] References Cited

U.S. PATENT DOCUMENTS

| | | |
|---|---|---|
| 4,439,790 | 3/1984 | Yoshida .................................. 358/449 |
| 4,686,577 | 8/1987 | Arimoto .................................. 358/449 |
| 4,698,511 | 10/1987 | Sueda et al. ............................ 358/449 |
| 5,001,574 | 3/1991 | Shimizu et al. ........................ 358/448 |
| 5,453,611 | 9/1995 | Oozu ...................................... 250/208.1 |
| 5,503,904 | 4/1996 | Yoshinaga et al. ..................... 428/195 |

Primary Examiner—Edward L. Coles, Sr.
Assistant Examiner—Fan Lee
Attorney, Agent, or Firm—Fitzpatrick, Cella, Harper & Scinto

[57] ABSTRACT

An original-detection device includes a pressing member for pressing an original on an original-mount from a side opposite to a surface illuminated by scanning light, an absorption member, provided on an original-pressing surface of the pressing member, for absorbing light of a predetermined wavelength region within an invisible region, a filter for transmitting light of the predetermined wavelength region of reflected light obtained by projecting the scanning light onto the original or the original-pressing surface, a photosensor for sensing light transmitted through the filter, and a detection circuit for detecting the original on the original-mount based on an output from the photosensor.

23 Claims, 18 Drawing Sheets

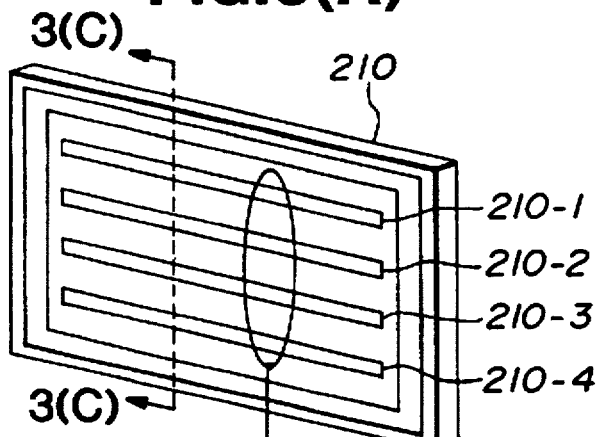
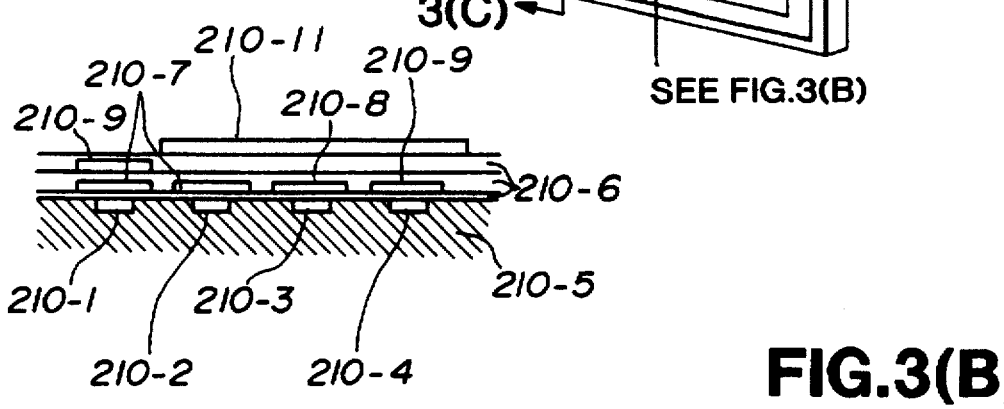
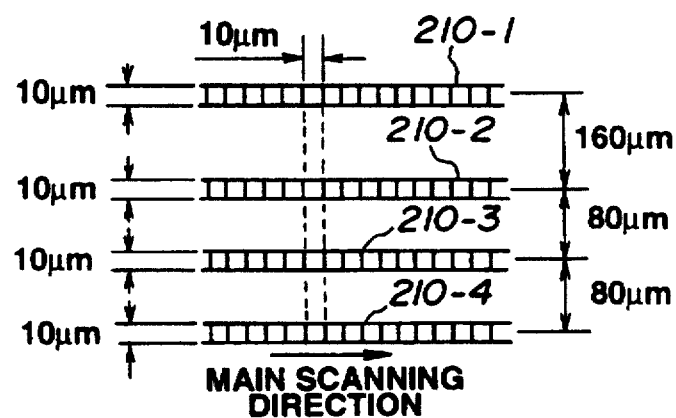

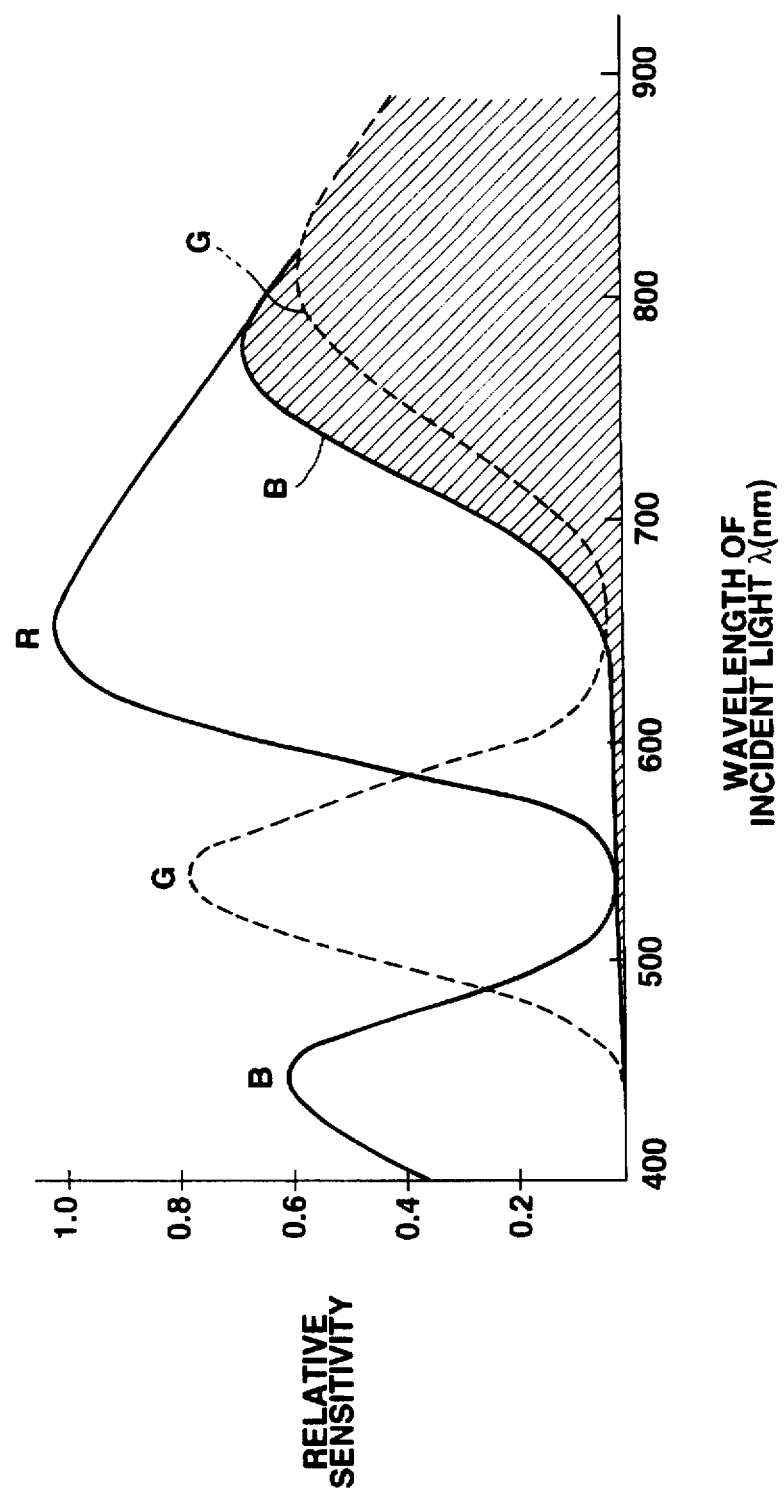

ORIGINAL-DETECTION METHOD AND DEVICE, AND ORIGINAL-PROCESSING DEVICE HAVING AN ORIGINAL-DETECTION FUNCTION

BACKGROUND OF THE INVENTION

1. Field of the Invention

This invention relates to an original-detection method and apparatus, to be used in a copier or the like, for detecting the position and/or size of an original mounted on an original-mount, and relates to an original-processing device having an original-detection function.

2. Description of the Related Art

Some copiers, facsimile apparatuses and the like have the function of detecting the size and position of an original to be read. The assignee of the present application has proposed, for example, in U.S. Pat. Nos. 4,439,790, 5,001,574 and 4,686,577, original-detection devices to be used in digital copiers.

Original-detection devices of digital copiers detect the size and position of an original mounted on an original-mount, and are therefore used in APS's (automatic paper selectors) and AMS's (automatic magnitude selectors), and for black-frame erasure and the like.

The APS detects the position (or the size) of an original and selects copying paper having an optimum size from a magnification which has been set in advance (automatic paper-size selection). The AMS has the function of detecting positions (the size) of an original and selecting an optimum copying magnification from the size of paper which has been set in advance (automatic magnification selection). When the size of an original is smaller than the size of the copying paper, boundary portions between the original and the paper size on an original-pressing plate are copied to produce a black frame. This black frame can be erased by copying only an internal region more or less inside the region of the original determined by detection of the original (i.e., assuming this region to be the region of the original). This operation is termed black-frame erasure.

In a conventional original-detection device, the presence of an original is detected using a photosensor for sensing light subjected to irregular reflection from the original illuminated by visible light from a light source. In this case, a mirror-finished pressing plate is used as an original-pressing plate so -that the visible light is subjected to regular reflection and therefore does not reach the photosensor. It can be determined that the original is present if irregularly reflected light is sensed by the photosensor, and therefore it is possible to discriminate between the original and the original-pressing plate.

In another approach, an original-pressing plate having a color, such as yellow, is used, and the original is discrimated from the original-pressing plate due to a difference in colors.

However, if a mirror-finished original-pressing plate is used, since the original-pressing plate is recognized as a black image, there is the possibility that the portion of the original-pressing plate within a region recognized as the region of an original is recorded in black depending on the shape or the posture of the original. In addition, since a mirror-finished reflector has inferior original-feedability, it cannot be used as a conveying belt of an original-feeding device (DF (document feeder). Hence, an original cannot be detected when mounting a DF.

When using a yellow original-pressing plate, particularly in a color copier, there is the possibility that the portion of the original-pressing plate within a region recognized as the region of an original is copied yellow depending on the shape or the posture of the original, thereby deteriorating copy quality.

SUMMARY OF THE INVENTION

The present invention has been made in consideration of the above-described problems.

It is an object of the present invention to provide an original-detection method and apparatus in which an original can be detected using light of an invisible region, and in which visible characteristics (the color and the like) of an original-pressing plate can be freely set.

It is another object of the present invention to provide an original-detection method and apparatus in which an original-pressing plate can be used also as a conveying belt by detecting an original using light of an invisible region.

It is still another object of the present invention to provide an original-processing device for processing an image of an original in accordance with detection of the position or size of the original.

According to one aspect, the present invention, which achieves these objectives, relates to an original-detection device including a pressing member for pressing an original on an original-mount from a side opposite to a surface illuminated by scanning light, an absorption member, provided on an original-pressing surface of the pressing member, for absorbing light of a predetermined wavelength region within an invisible region, a filter for transmitting light of the predetermined wavelength region of reflected light obtained by projecting the scanning light onto the original or the original-pressing surface, a photosensor for sensing light transmitted through the filter, and a detector for detecting the presence or the absence of the original on the original-mount based on an output from the photosensor.

According to another aspect, the present invention relates to an original-detection device having a pressing member for pressing an original on an original-mount from a side opposite to a surface illuminated by scanning light, an absorption member, provided on an original-pressing surface of the pressing member, for absorbing light of a predetermined wavelength region within an invisible region, a filter for transmitting light of the predetermined wavelength region of reflected light obtained by projecting the scanning light onto the original or the original-pressing surface, a first photosensor for sensing light transmitted through the filter, a second photosensor for sensing respective color components of the reflected light, and a detector for detecting the presence or the absence of the original on the original-mount based on an output from the first photosensor and an output for a predetermined color component from the second photosensor.

According to still another aspect, the present invention relates to an original-detection method including the steps of pressing an original on an original-mount from a side opposite to a surface illuminated by scanning light using a pressing member having an absorbing member for absorbing light of a predetermined wavelength region within an invisible region on an original-pressing surface for pressing the original, sensing light transmitted through a filter for transmitting light of the predetermined wavelength region of reflected light obtained by projecting the scanning light onto the original or the original-pressing surface by a photosensor, and detecting the presence or the absence of the original on the original-mount based on an output from the photosensor.

According to another aspect, the present invention relates to an original-detection step comprising the steps of pressing an original on an original-mount from a side opposite to a surface illuminated by scanning light using a pressing member having an absorption member for absorbing light of a predetermined wavelength region within an invisible region on an original-pressing surface for pressing the original, sensing light transmitted through a filter for transmitting light of the predetermined wavelength region of reflected light obtained by projecting the scanning light onto the original or the original-pressing surface using a first photosensor, and sensing respective color components of the reflected light using a second photosensor, and detecting the presence or the absence of the original on the original-mount based on an output from the first photosensor and an output for a predetermined color component from the second photosensor in the sensing step.

According to still another aspect, the present invention relates to an original-processing device including a pressing member for pressing an original on an original-mount from a side opposite to a surface illuminated by scanning light, an absorption member, provided on an original-pressing surface of the pressing member, for absorbing light of a predetermined wavelength region within an invisible region, a filter for transmitting light of the predetermined wavelength region of reflected light obtained by projecting the scanning light onto the original or the original-pressing surface, a photosensor for sensing light transmitted through the filter, a detector for detecting the presence or the absence of the original on the original-mount based on an output from the photosensor, and a processor for processing an image of the original based on a detection output from the detector.

According to still another aspect, the present invention relates to an original-processing method including the steps of pressing an original on an original-mount from a side opposite to a surface illuminated by scanning light using a pressing member having an absorbing member for absorbing light of a predetermined wavelength region within an invisible region on an original-pressing surface for pressing the original, sensing light transmitted through a filter for transmitting light of the predetermined wavelength region of reflected light obtained by projecting the scanning light onto the original or the original-pressing surface by a photosensor, detecting the presence or the absence of the original on the original-mount based on an output from the photosensor, and processing an image of the original based on a detection output indicating the presence or the absence of the original.

Preferably, the light of the predetermined wavelength region is infrared light, and the filter includes a first filter portion for transmitting light of an infrared region and a second filter portion for cutting light of a far-infrared region. Since no problem arises even if the second filter portion operates on photosensors for sensing color components of the visible region, the second filter portion can be included in a common optical system for respective photosensors, and therefore filters can be easily designed.

Preferably, the absorption member is obtained by coating a substantially transparent infrared-absorbing material on the original-pressing surface. Since the infrared-absorbing material is substantially transparent, an original-pressing plate having a desired color can be obtained by using the desired color for the background of the original-pressing surface.

Preferably, the original-pressing surface is white, because little influence is exerted during image formation when reading an original in a copying operation or the like.

Preferably, the pressing member also operates as a conveying belt for conveying an original, because then, automatic feeding of originals can be achieved.

The foregoing and other objects, advantages and features of the present invention will become more apparent from the following detailed description of the preferred embodiments taken in conjunction with the accompanying drawings.

BRIEF DESCRIPTION OF THE DRAWINGS

FIGS. 3(A) through 3(C) are diagrams illustrating the configuration of a CCD (charge-coupled device) 210;

FIG. 4 is a graph illustrating characteristics of respective R, G and B filters;

DETAILED DESCRIPTION OF THE PREFERRED EMBODIMENTS

Preferred embodiments of the present invention will now be described with reference to the drawings. Although in each of the following embodiments, a copier is illustrated as an apparatus to which the present invention is applied, the present invention is not limited to such an apparatus, but may, of course, be applied to many other kinds of apparatuses.

First Embodiment

Figure 1:
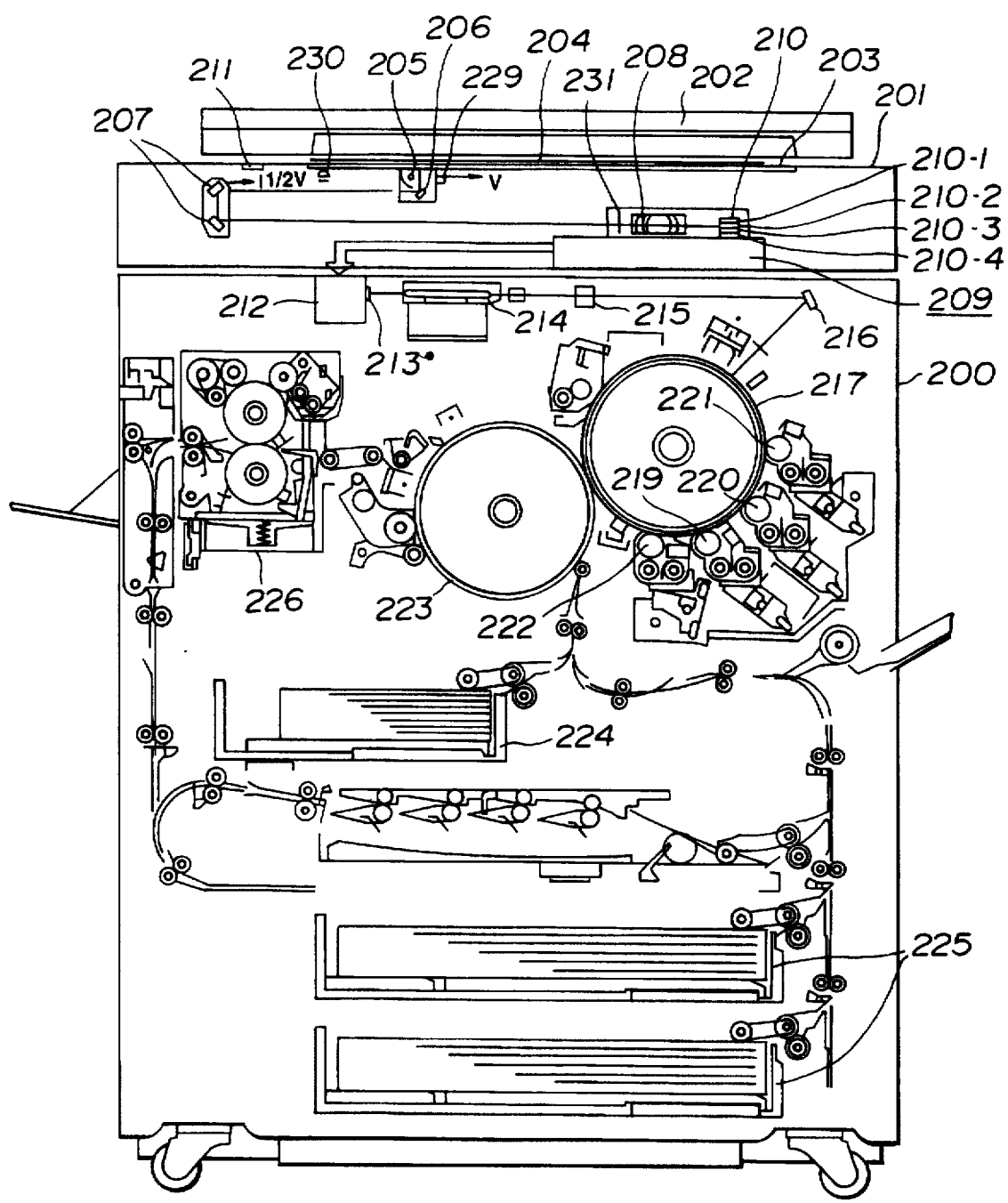
FIG. 1 is a diagram illustrating the configuration of a color copier according to a first embodiment of the present invention.

FIG. 1 is a diagram illustrating the configuration of a color copier according to a first embodiment of the present invention. In FIG. 1, an image scanner unit 201 reads an original and performs digital signal processing. A printer unit 200 prints a full-color image corresponding to an image of the original read by the image scanner unit 201 on recording paper.

In the image scanner unit 201, an original-pressing plate 202 presses an original 204 on original-mount glass 203 thereagainst. The original 204 is illuminated by light from a halogen lamp 205. Reflected light from the original 204 is guided to mirrors 206 and 207, and is imaged onto a four-line sensor (hereinafter termed a "CCD") 210 by a lens 208. A far-infrared-cut filter 231 is provided on the lens 208.

The CCD 210 reads red (R), green (G) and blue (B) color components, serving as full-color information, and an infrared component (IR), serving as invisible-light information, by performing color separation of optical information from the original, and transmits obtained signals to a signal processing unit 209. The R, G and B color components are read by photosensors 210-2–210-4, respectively. The inframed component (IR) is read by a photosensor 210-1. By mechanical movement of the halogen lamp 205 and the mirror 206 at a speed V, and the mirror 207 at a speed V/2, in a direction (hereinafter termed a "sub-scanning direction") perpendicular to a directions of electrical scanning of the CCD 210 (hereinafter termed a "main scanning direction"), the entire surface of the original-mount glass 203 is read by scanning.

Figure 2:
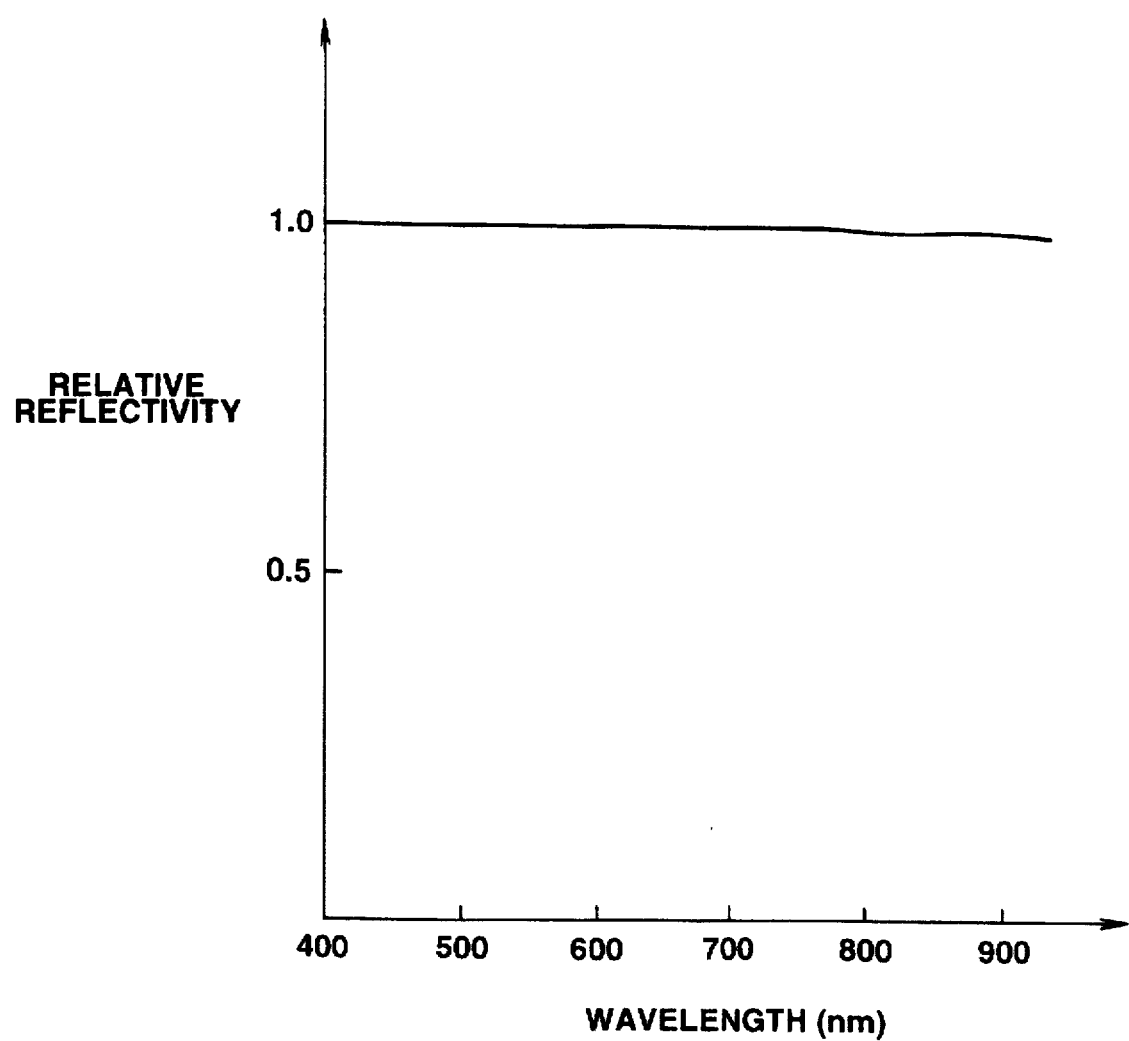
FIG. 2 is a graph illustrating a light reflection characteristic of a standard white plate.

A standard white plate 211 is a standard plate for generating correction data when the photosensors 210-1–210-4 obtain IR, R, G and B data, respectively. As shown in FIG. 2, the standard white plate 211 has a substantially uniform reflection characteristic over a region from visible light to infrared light, and is seen as a white plate. Correction of output data for infrared light from the photosensor 210-1 and correction of output data for visible light from the photonsensors 210-2-210-4 are performed using the standard white plate 211. A photosensor 230 generates an image-leading-edge signal VTOP in cooperation with a flag plate 229.

The signal processing unit 209 generates magenta (M), cyan (C), yellow (Y) and black (BK) image signals by electrically processing the transmitted R, G and B signals, and transmits the image signals to a printer unit 200. Since the printer unit 200 is configured so as to plane-sequentially record M, C, Y and BK images, one of the M, C, Y and BK image signals is transmitted to the printer unit 200 at each complete scan of the original by the image scanner unit 201, and a single printing operation is completed by performing four original-scanning operations.

The M, C, Y and BK image signals transmitted from the image scanner unit 201 are transmitted to a laser driver 212. The laser driver 212 performs modulation driving of a semiconductor laser 213 in accordance with the M, C, Y and BK image signals. The laser light from the semiconductor laser 213 scans the surface of a photosensitive drum 217 via a polygonal mirror 214, an f-θ lens 215 and a mirror 216. A magenta developing unit 219, a cyan developing unit 220, a yellow developing unit 221 and a black developing unit 222 alternately contact the photosensitive drum 217 and develop M, C, Y and BK electrostatic latent images formed on the photosensitive drum 217 with corresponding toner particles, respectively. A sheet supplied from a sheet cassette 224 or 225 is wound around a transfer drum 223, and a toner image formed on the photosensitive drum 217 is transferred onto the sheet. After sequentially transferring M, C, Y and BK toner images onto the sheet, the sheet is discharged after passing through a fixing unit 226.

Next, the image scanner unit 201 will be described in detail.

The halogen lamp 205, serving as an original-illuminating light source, is used for reading both visual information and infrared information. That is, the halogen lamp 205 has illuminating-wavelength components necessary for reading two kinds of information. By using such a combined illuminating system, two kinds of illuminating light having different wavelength components for reading visual information and infrared information can be effectively projected onto the original.

FIGS. 3(A) through 3(C) are diagrams illustrating the configuration of the CCD 210 used in the present embodiment. FIG. 3(A) illustrates an external appearance of the CCD 210. In FIG. 3(A), the photosensor 210-1 is an array (a line sensor) comprising several thousand photosensing elements for sensing infrared light. Each of the photosensors 210-2, 210-3 and 210-4 is also an array (a line sensor) comprising several thousand photosensing elements for sensing a corresponding one of R, G and B wavelength components.

As shown in FIG. 3(B), each of the photosensors 210-1–210-4 has square openings whose size is 10 μm in the main scanning direction as well as in the sub-scanning direction. These four photosensing arrays having different optical characteristics are formed on the same monolithic silicon chip so as to be arranged in parallel, in order to read the same line of an original. By using the COD 210 having the above-described configuration, a combined optical system including lenses and the like is used for reading visible information and infrared information. It is thereby possible to improve accuracy in optical adjustment and the like, and to easily perform adjustment.

As described above, each of the photosensing elements of the photosensors 210-1–210-4 has the size of 10 μm per pixel in the main scanning direction. Each of the photosensors 210-1–210-4 includes photosensing elements covering 5,000 pixels in the main scanning direction so as to be able to read an A3-size original with a resolution of 400 dpi (dots per inch) in the direction of the original's shorter side (297 mm).

The distance between adjacent lines of the photosensors 210-2–210-4 is 80 μm which equals eight lines in the subscanning direction having a resolution of 400 dpi. The distance between the lines of the photosensors 210-1 and 210-2 is 160 μm (corresponding to 16 lines) which is twice the above-described distance.

FIG. 3(C) is a cross-sectional view taken along a dotted line shown in FIG. 3(A). The photosensor 210-1 for reading infrared information, and the photosensors 210-2–210-4 for reading R, G and B components of visual information, respectively, are disposed on a silicon substrate 210-5. R filters 210-7 for transmitting a red-wavelength component of visual light are disposed above the IR photosensor 210-1 and the R photosensor 210-2. Similarly, a G filter 210-8 is disposed above the G photosensor 210-3 and B filters 210-9 are disposed above the IR photosensor 210-1 and the B photosensor 210-4. Reference numeral 210-11 represents an infrared-cut filter.

Next, a description will be provided of spectral characteristics of the R, G and B filters of the CCD 210. FIG. 4 is a graph illustrating characteristics of the R, G and B filters used in the first embodiment. In FIG. 4, a curve R illustrates the output characteristic of the R photosensor 210-2 which uses the R filter 210-7. The R photosensor 210-2 is sensitive to light of a red-wavelength region and an infrared-wavelength region. A curve G illustrates the output characteristic of the G photosensor 210-3 which uses the G filter 210-8. The photosensor 210-3 is sensitive to light of a green-wavelength region and an infrared-wavelength region. A curve B illustrates the output characteristic of the B photosensor 210-4 which uses the B filter 210-9. The photosensor 210-4 is sensitive to light of a blue-wavelength region and an infrared-wavelength region.

As shown in FIG. 3(C), the R filter 210-7 and the B filter 210-9 are superposed above the IR sensor 210-1. Accordingly, the IR sensor 210-1 is sensitive only to light of an infrared region indicated by hatching in. FIG. 4.

Figure 5:
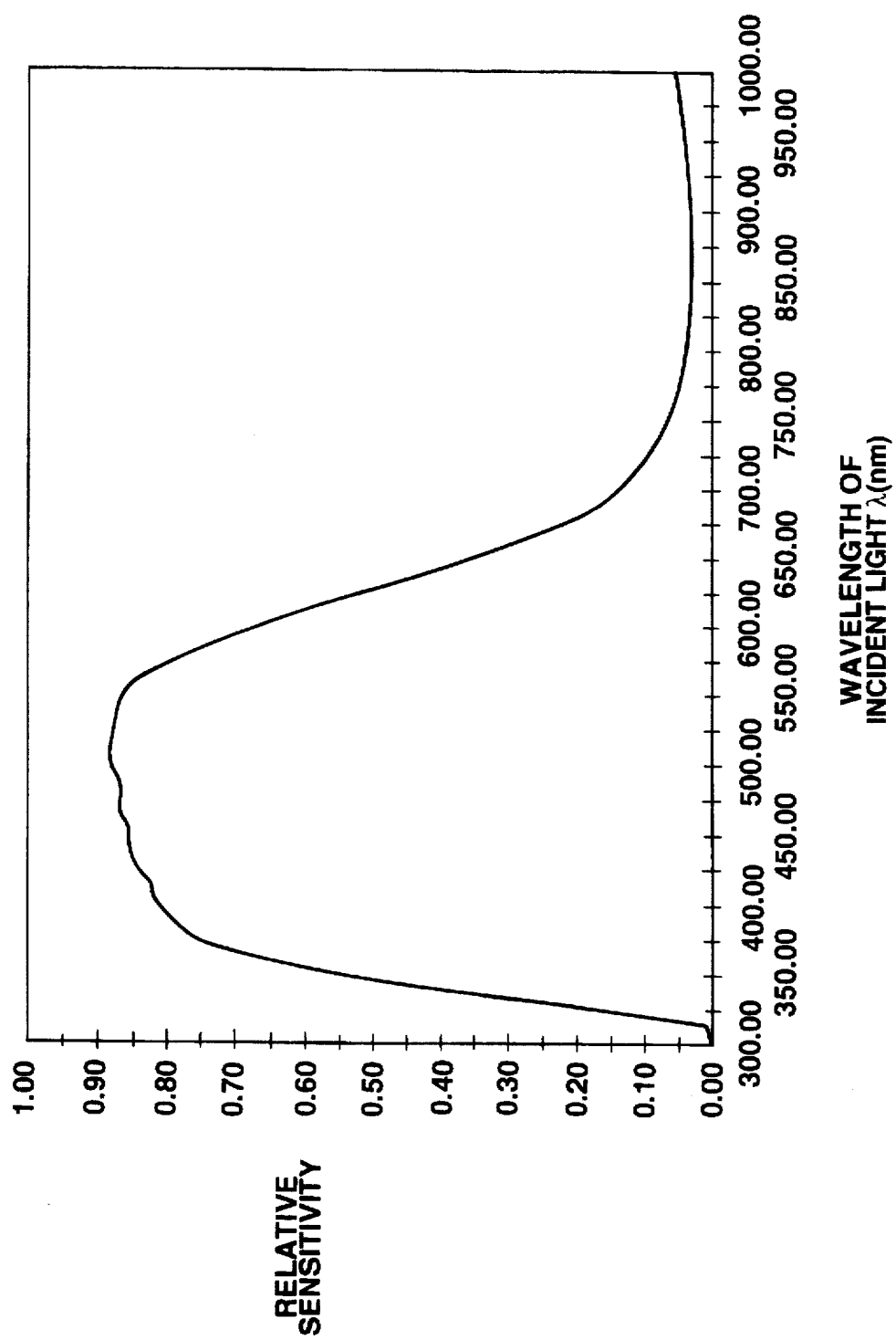
FIG. 5 is a graph illustrating a characteristic of an infrared-cut filter used in the first embodiment.

As is apparent from FIG. 4, the R filter 210-7, the G filter 210-8 and the B filter 210-9 are sensitive to infrared light having wavelengths exceeding 700 nm. Accordingly, as shown in FIG. 3(C), the infrared-cut filter 210-11 is provided above the R photosensor 210-2, the G photosensor 210-3 and the B photosensor 210-4. The infrared-cut filter 210-11 is made of laminated vacuum-deposited films of $SiO_2$ and $TiO_2$, and has a characteristic as shown in FIG. 5. FIG. 5 is a graph illustrating the characteristic of the infrared-cut filter used in the first embodiment.

In FIG. 3(C), reference numeral 210-6 represents a flattening layer comprising a transparent organic film.

Next, a description will be provided of the original-pressing plate 202 used in the first embodiment.

Figure 6:
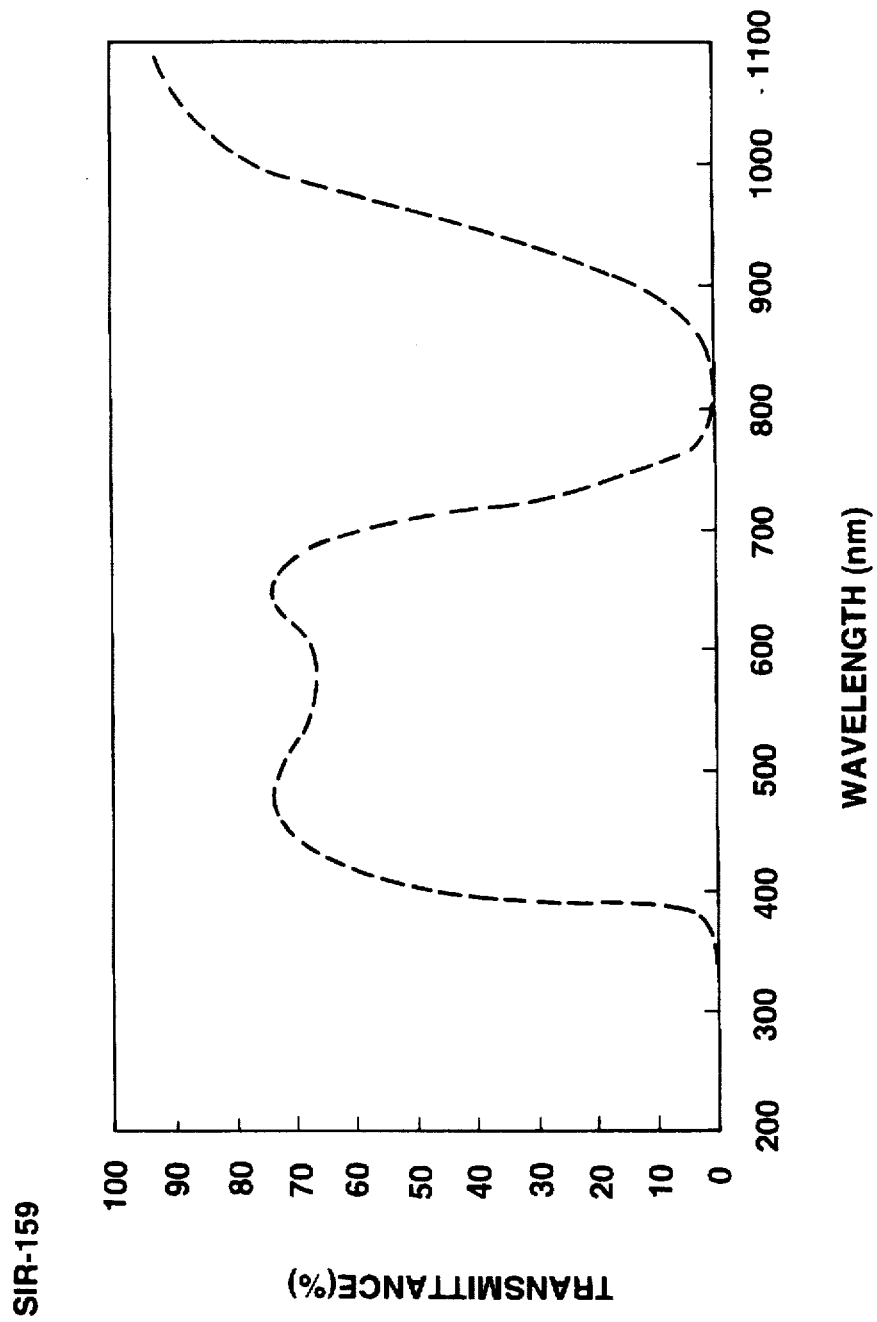
FIG. 6 is a graph illustrating a spectral absorption characteristic of an infrared-absorbing material used in the first embodiment.

An infrared-absorbing material for absorbing infrared light is coated on the original-pressing plate 202. FIG. 6 is a graph illustrating the spectral absorption characteristic of the infrared absorbing material used in the first embodiment. In the present embodiment, an infrared-absorbing material SIR-159 made by Mitsui Toatsu Chemicals, Inc. is used. As is apparent from FIG. 6, the material SIR-159 absorbs light at an infrared-wavelength region of 750 nm–850 nm. In the present embodiment, since the presence or the absence of reflection of infrared light from this infrared-absorbing material is detected by the IR photosensor 210-1, the IR photosensor 210-1 must have a characteristic of detecting only infrared light of a wavelength region of 750 nm–850 nm.

Figure 7:
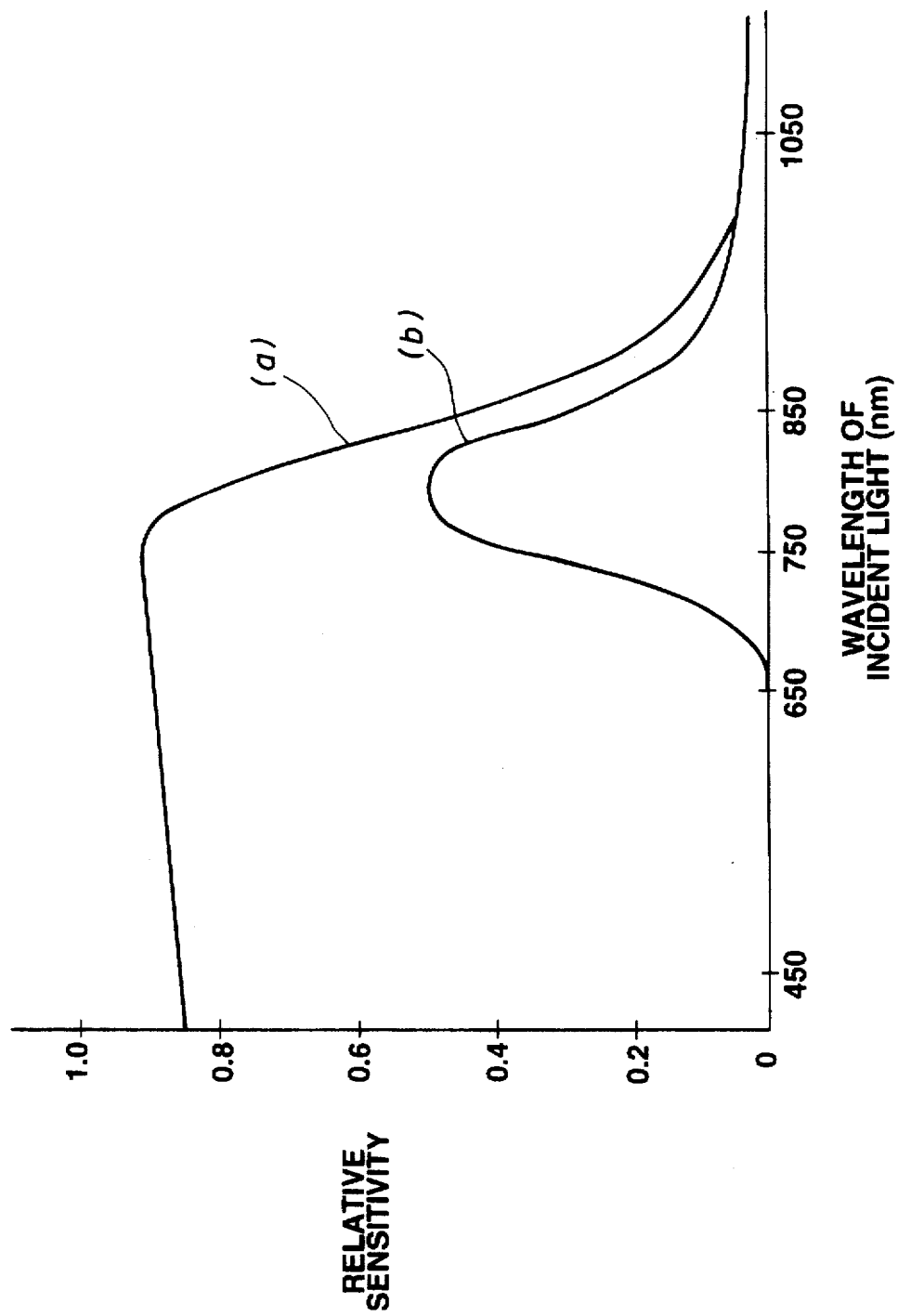
FIG. 7 is a graph illustrating a spectral characteristic of a far-infrared-cut filter and a spectral sensitivity characteristic of an IR (infrared) sensor using the filter.

In order to realize this requirement, a far-infrared-cut filter 231, comprising a dichroic mirror, having a characteristic indicated by (a) shown in FIG. 7 is provided in front of the lens 208. As a result, the IR photosensor 210-1 has a spectral sensitivity characteristic (b) shown in FIG. 7 obtained by multiplying the characteristic indicated by the hatching shown in FIG. 4 by the characteristic (a) shown in FIG. 7. As is apparent from the characteristic (b) shown in FIG. 7, the IR photosensor 210-1 is sensitive to infrared light having a spectral half-width (which indicates a wavelength region having a sensitivity of half the maximum value of the relative sensitivity) of 750 nm–850 nm.

As is apparent from the characteristic (a) shown in FIG. 7, since this far-infrared-cut filter 231 causes no problem when it is provided in front of the R, G and B photosensors 210-2–210-4, as well as when it is provided in front of the IR photosensor 210-1, the far-infrared-cut filter 231 may be provided on a lens unit including the common lens 208 for visible light and infrared light. Accordingly, it is only necessary to take into consideration a far-infrared-cut characteristic when designing a filter to be mounted on the lens 208, and an excellent far-infrared-cut characteristic can be realized by thin interference films having a simple configuration.

Next, a description will be provided of the flow of image signals.

Figure 8:
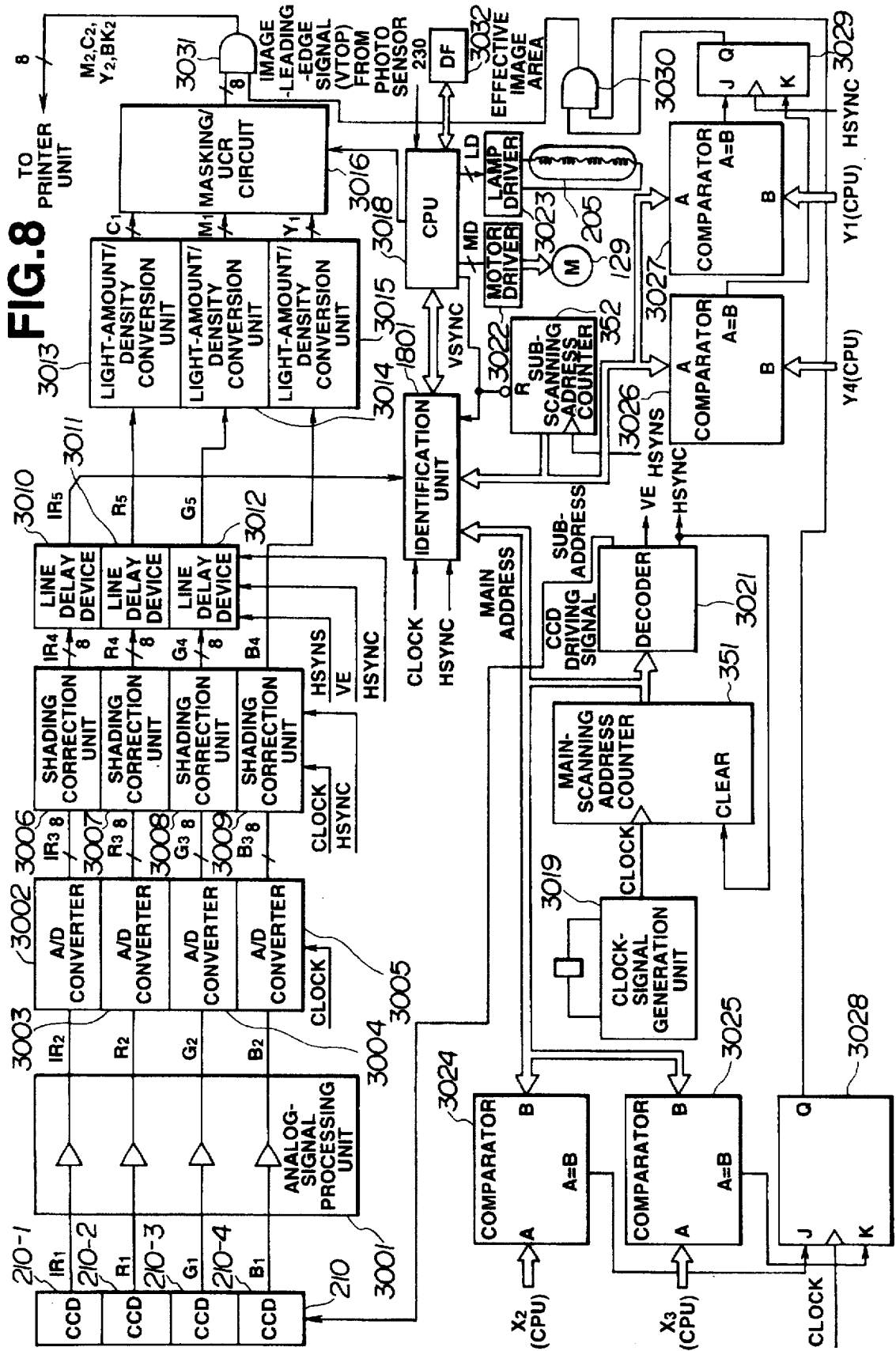
FIG. 8 is a block diagram illustrating the configuration of a control circuit in an image scanner unit of the first embodiment.

FIG. 8 is a block diagram illustrating the configuration of control in the image scanner unit 201 of the first embodiment. Image signals $IR_1$, $R_1$, $G_1$ and $B_1$ output from the CCD 210 are input to an analog-signal processing unit 3001, and is subjected to gain adjustment and offset adjustment. Thereafter, color signals $IR_2$, $R_2$, $G_2$ and $B_2$ are converted into 8-bit digital image signals by A/D converters 3002–3005, respectively. The digital image signals $IR_3$, $R_3$, $G_3$ and $B_3$, are input to shading correction units 3006–3009, and are subjected to known shading correction using a read signal obtained from the standard white plate 211.

A clock-signal generation unit 3019 generates a clock signal in units of a pixel. A main-scanning address counter 1351, which is an up-counter, counts the number of clock pulses generated from the clock-signal generation unit 3019, and generates pixel addresses for one line. A decoder 3021 decodes main-scanning addresses output from the mains-canning address counter 351, and generates a CCD driving signal in units of a line, comprising shift pulses, reset pulses and the like, a VE signal indicating an effective region in a read signal for one line from the COD 210, or a line synchronizing signal HSYNC. The main-scanning address counter 351 is cleared by the HSYNC signal, and starts counting of main-scanning addresses of the next line.

As shown in FIG. 3(B), the photosensors 210-1, 210-2, 210-3 and 210-4 of the CCD 210 are arranged at predetermined distances. Hence, these photosensors read different line positions on the original on the original-mount. Line delay devices 3010, 3011 and 3012 correct such spatial deviations in the sub-scanning direction. More specifically, in the positional relationship shown in FIG. 3(B), the correction is performed by delaying $IR_4$, $R_4$ and $G_4$ signals, which are obtained by reading original-information on lines preceding a line for a $B_4$ signal in the sub-scanning direction, by 32 lines, 16 lines and 8 lines, respectively, in the sub-scanning direction to be adjusted to the B4 signal.

Each of light-amount/density conversion units 3013, 3014 and 3015 comprises a look-up-table ROM (read-only memory). The light-amount/density conversion units 3013–3015 convert $R_5$, $G_5$ and $B_4$ luminance signals into $C_1$, $M_1$ and $Y_1$ density signals, respectively. Reference numeral 3016 represents a known masking/UCR circuit. Although a detailed description will be omitted, the masking/UCR circuit 3016 sequentially converts input three-primary-color signals $C_1$ $M_1$ and $Y_1$ into $Y_2$, $M_2$, $C_2$ and $BK_2$ signals, and outputs these signals to the printer unit 200 through AND gate 3031 with a predetermined bit length (for example, 8 bits) at every reading operation.

An identification unit 1801 detects the original using infrared light, and notifies a CPU (central processing unit) 3013 of the positions of respective apices of infrared light reflected from the original. The CPU 3018 controls a DF (an original-feeding device) 3032, and performs sequence control, such as control of a motor 129 through a motor driver 3022 of an original-reading optical system, on-off control of the original-illuminating lamp 205 through a lamp driver 3023 and the like, and generates a pixel-interval signal VSYNC in the sub-scanning direction. The CPU 3018 also calculates image processing parameters for image trimming, magnification change, shift and the like, and controls the operations of respective units in accordance with the parameters.

Figure 9:
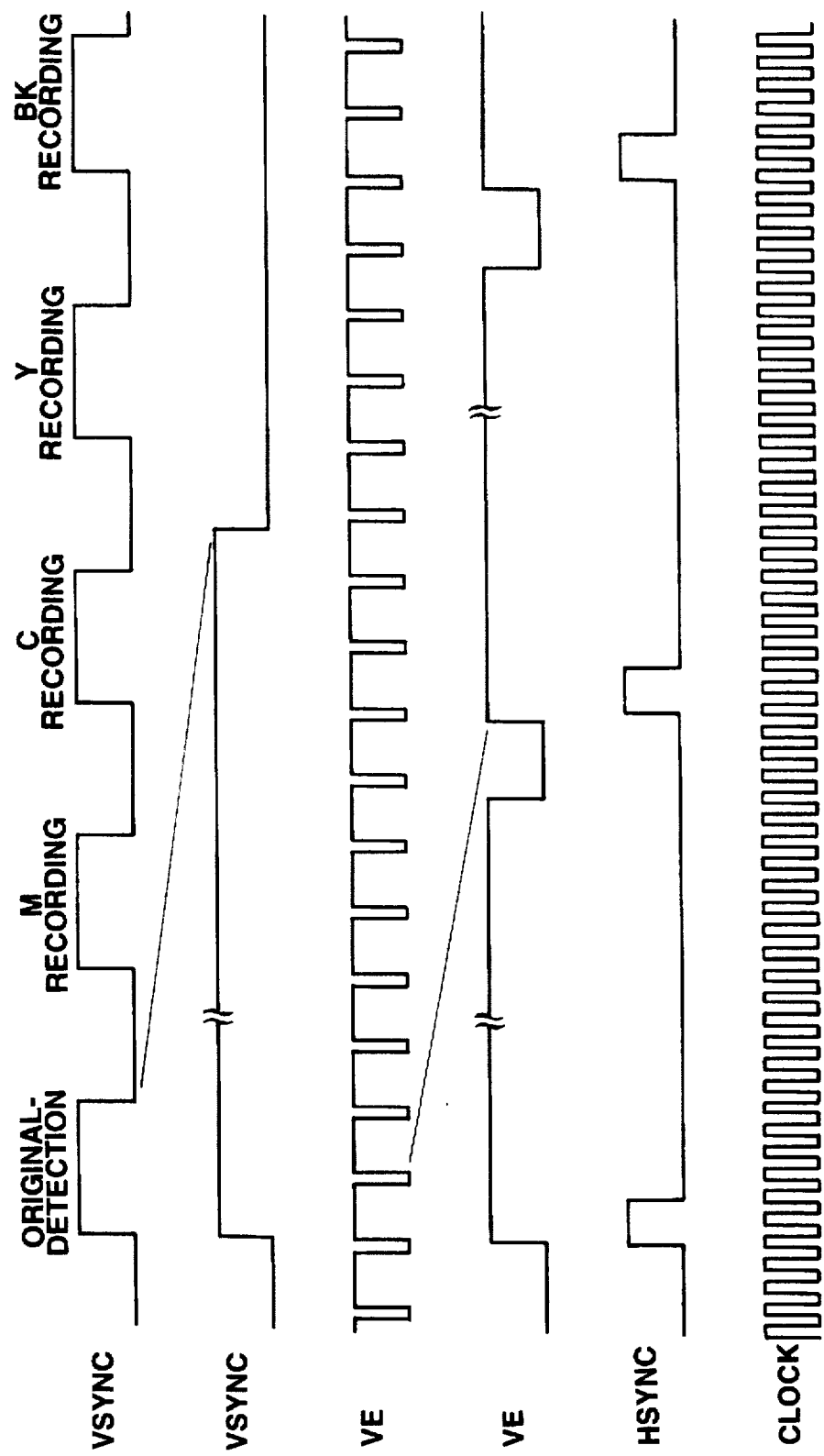
FIG. 9 is a diagram illustrating timings of respective control signals in the first embodiment.

FIG. 9 is a diagram illustrating timings for respective control signals in the first embodiment.

The VSYNC signal is a signal indicating an effective interval of the image in the sub-scanning direction, and performs scanning for detecting the original and scanning for reading the image at intervals "1". Scanning for reading the image is executed four times, whereby output signals C, M, Y and BDK are sequentially formed.

A signal VE represents an effective interval of the image in the main scanning direction, and assumes "1" from the rise of "0"→"1" of the horizontal synchronizing signal HSYNC until reading of a predetermined number of pixels is completed. The horizontal synchronizing signal HSYNC provides a timing for the start position of main scanning. A CLOCK signal is a pixel synchronizing signal, which transfers image data at a rising timing of "0"→"1".

Next, a description will be provided of the operation of detection of the original using infrared light.

Although carbon black and some green color materials absorb infrared light, most originals reflect infrared light. In the first embodiment, before performing scanning (for reading) of an original in order to form/copy an image of the original, the original (the entire surface of the original-mount glass) is subjected to preliminary scanning, and the mounted position and the size of the original are detected using infrared information.

As described above, the original-pressing surface of the original-pressing plate 202 of the present embodiment is made of a material which absorbs infrared light and which is seen as a white material. In the present embodiment, an infrared-absorbing material (SIR-159 made by Mitsui Toatsu Chemicals, Inc.), which is seen to be substantially transparent, is coated on the surface of a white original-pressing plate. Thus, an original-pressing plate which is seen to be white and which absorbs infrared light is obtained.

Figure 10A:
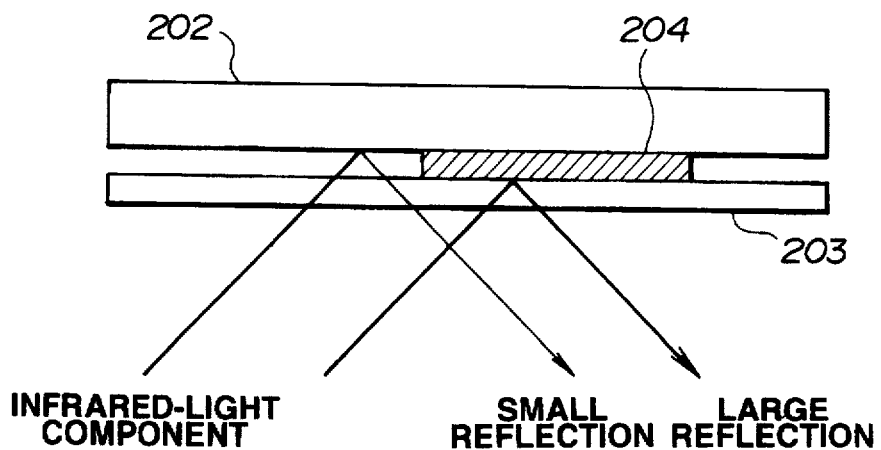
FIGS. 10(a) and 10(b) are diagrams illustrating reflection of infrared light in the first embodiment.
Figure 10B:
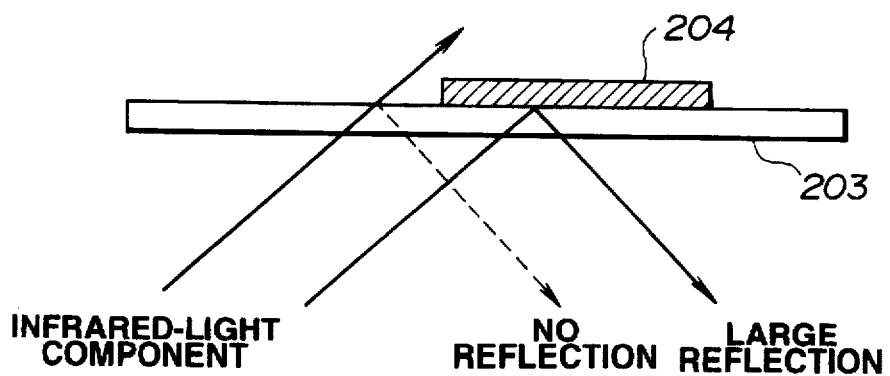

FIGS. 10(a) and 10(b) are diagrams illustrating reflection of infrared light in the present embodiment. As shown in FIG. 10(a), infrared light is projected onto the original 204 through the original-mount glass 203. The original 204 reflects the infrared light, and the reflected light enters the photosensor 210-1 via the mirrors 206 and 207. Since reflection of the infrared light is great at a region where the original 204 is present, a large IR signal is detected by the photosensor 210-1. On the other hand, since the original-pressing plate 202 on which the infrared-absorbing material is coated absorbs infrared light and therefore reflection of the infrared light is small at a region where the original 204 is absent, a small IR signal is detected. Thus, in the first embodiment, the reflected infrared light is detected by the photosensor 210-1, and the original 204 is detected in accordance with the magnitude of the IR signal using identification unit 1801 discussed above. Prescanning for detecting the original 204 is performed over the entire surface of the original-mount glass 203 both in the main scanning direction and the sub-scanning direction. Thereafter, reading scanning for printing is performed. The sub-scanning speed in the case of original-detection is higher than in the case of printing.

As shown in FIG. 10(b), even if the original-pressing plate 202 is absent (i.e., even if the original-pressing plate 202 is opened), since there is no reflection of the infrared light from a region where the original 204 is absent, it is possible to detect the original 204 in accordance with the magnitude of the infrared light as in the above-described case.

Figure 11:
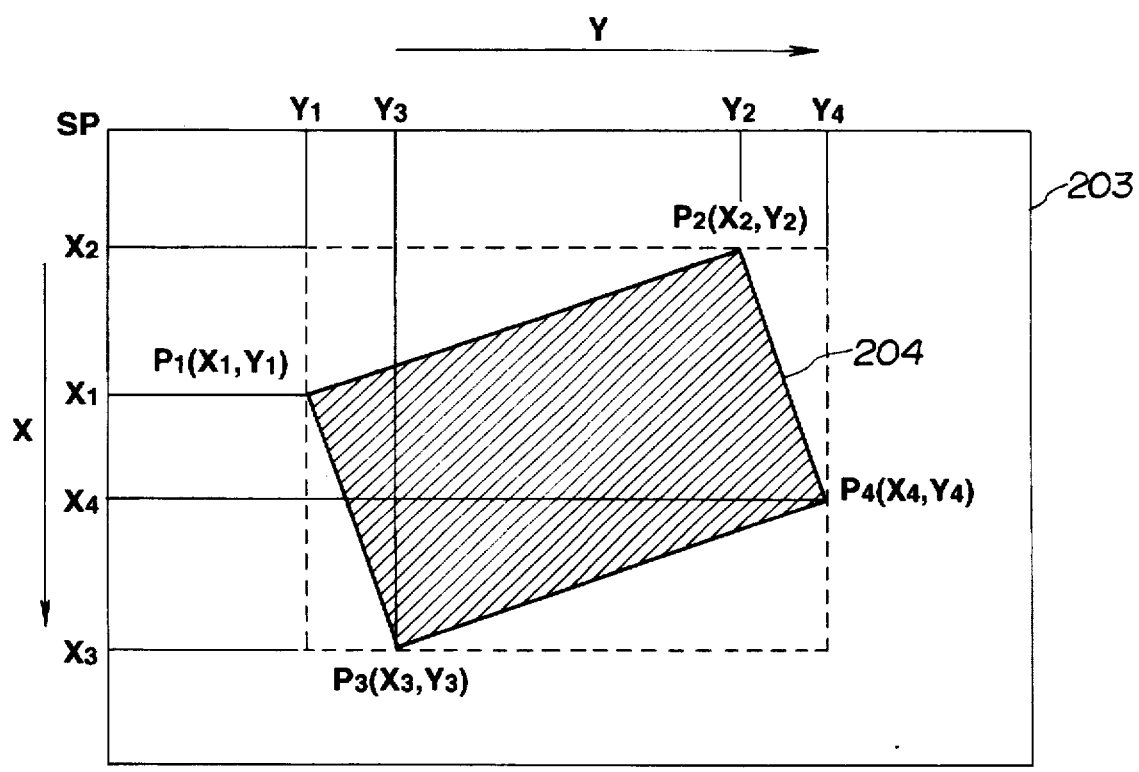
FIG. 11 is a diagram illustrating a state in which an original is mounted on original-mount glass.

FIG. 11 is a diagram illustrating a state in which the original 204 is mounted on the original-mount glass 203 of the reader unit 201 (shown in FIG. 1). In FIG. 11, the main scanning direction and the sub-scanning direction from basic coordinates SP on the original-mount glass 203 are represented by X and Y, respectively. The coordinates of the original 204 nearest the point SP in the sub-scanning direction are represented by $P_1$ $(X_1,Y_1)$, the coordinates of the original 204 nearest the point SP in the main scanning direction are represented by $P_2$ $(X_2,Y_2)$, the coordinates of the original 204 farthest from the point SP in the main scanning direction are represented by $P_3$ $(X_3,Y_3)$, and the coordinates of the original 204 farthest from the point SP in the sub-scanning direction are represented by $P_4$ $(X_4,Y_4)$. The coordinates of these four points are detected by performing scanning for original-detection before starting a recording operation by the printer unit 200, for example, during the period of a pre-rotation operation of the printer unit 200. The size and position of the original 204 can be determined by such original-detection. Hence, it is possible to execute APS (automatic paper selection), AMS (automatic magnification selection), black-frame erasure and the like, which have conventionally been executed.

Next, processing of detecting the points $P_1$–$P_4$ in the above-described original-detection will be described in detail.

Figure 12:
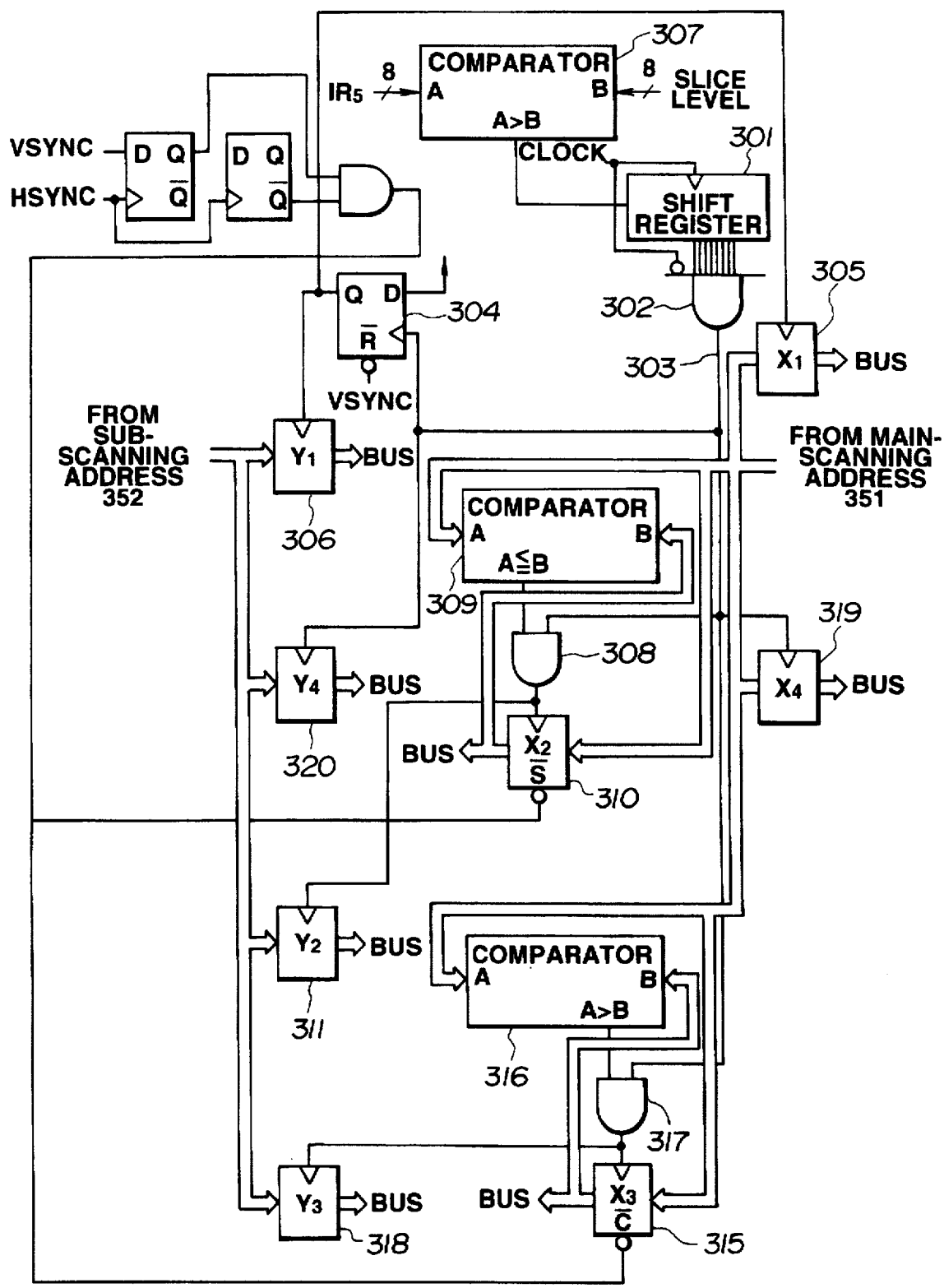
FIG. 12 is a block diagram illustrating an example of the configuration of circuitry for detecting an original using infrared light.

FIG. 12 is a block diagram illustrating an example of the configuration of circuitry for original-detection using infrared light in the identification unit 1801. As shown in FIG. 12, detection circuits for the points $P_1$–$P_4$ can be configured by logic circuits.

A comparator 307 compares the $IR_S$ signal from the line delay device 3010 shown in FIG. 8 with a predetermined slice level, and performs binary-coding of the $IR_S$ signal. A shift register 301 holds information relating to the presence or the absence of the original for eight continuous pixels of the binary-coded IR signal. An AND gate 302 detects if information relating to all of the eight continuous pixels held in the shift register 301 indicates "the presence of the original" (a high level). If all of the eight continuous pixels are represented by the IR signal (high-level signal), the AND gate 302 outputs "1" to a signal line 303 when the CLOCK signal goes low, i.e., to "0". In other cases, the AND gate 302 outputs "0" to the signal line 303 each time the CLOCK signal goes low. The AND gate 302 only outputs a signal when the CLOCK signal goes low because the data in the shift register 301 is updated when the CLOCK signal goes high. By thus determining the presence of the original only when the presence of the original is detected for all of eight pixels, erroneous detection can be prevented.

A flip-flop (F/F) 304 is reset before staring scanning of the original, and is set when the output of the AND gate 302 assumes "1" (i.e., when the IR signal is detected for all of eight pixels) after starting scanning of the original. The value of the main-scanning address counter 351 shown in FIG. 8 or a dedicated counter is loaded in a latch 305 when the output of the F/F 304 switches from "0" to "1". This value becomes the value of the coordinate $X_1$. The value of the sub-scanning address counter 352 shown in FIG. 8 or a dedicated counter at that time is loaded in a latch 306. This value becomes the value of the coordinate $Y_1$. That is, the coordinates of the position where the original is first detected after starting scanning for original-detection are recorded, and thus the coordinates $P_1$ $(X_1,Y_1)$ are determined.

Every time a signal "1" is output to the signal line 303, a comparator 316 compares the value of the mainscanning address counter 351 with the value held in a latch 315 (which is initialized to "0" by a VSYNC signal). If the value of the main-scanning address counter 351 is greater than the value held in the latch 315, a gate circuit 317 sets the latch 315, whereby the value of the main-scanning address counter 3511 is loaded in the latch 315. At that time, the value of the sub-scanning address counter 352 is loaded in a latch 318. This operation is processed before information relating to the next eight pixels enters the shift register 301. By thus comparing data of the main-scanning address counter 351 with data held in the latch 315 over the entire image region, the maximum value of the coordinates of the original in the X direction from the point SP, as shown in FIG. 11, is held in the latch 315, and the coordinate of that point in the Y direction at that time is held in the latch 318. This point becomes $P_3$ $(X_3,Y_3)$.

Similarly, every time a signal "1" is output to the signal line 303, a comparator 309 compares the value of the main-scanning address counter 351 with the value held in a latch 310 (which is initialized by a VSYNC signal, and the maximum value in the main scanning direction is set). If the value held in the latch 310 is greater than or equal to the value of the main-scanning address counter 351, a gate circuit 308 sets the latch 310, whereby the value of the main-scanning address counter 351 is loaded and held in the latch 310. By performing the above-described comparison operation over the entire image region, the minimum value of coordinates of the original in the X direction from the point SP, as shown in FIG. 11, is held in the latch 310. This value becomes $X_2$. At that time, the value of the subscanning address counter 352 is loaded in the latch 310. This value becomes $Y_2$. Thus, the point $P_2$ $(X_2,Y_2)$ is determined.

Every time an 8-bit signal indicating the presence of the original appears in the entire image region, the value of the main-scanning address counter 351 and the value of the sub-scanning address counter 352 are loaded in the latches 319 and 320, respectively. Accordingly, when prescanning for original-detection has been completed, the values of the counters 351 and 352 when the last 8-bit signal indicating the presence of the original has appeared are held in the latches 319 and 320, respectively. These values represent the point $P_4$ $(X_4,Y_4)$.

Data lines of the above-described eight latches 306, 320, 311, 318, 305, 310, 315 and 319 are connected to a bus line BUS of the CPU 3018. The CPU 3018 detects the position of the original on the original-mount glass by reading the data held in these latches and also detects the size of the original by calculating the values $(X_3-X_2)$ and $(Y_4-Y_1)$ when scanning for original-detection has been completed.

The region enclosed by the points $X_2$, $X_3$, $Y_1$ and $Y_4$ obtained from these data is recognized as an original-region, i.e., an effective pixel area (the region within the rectangle indicated by hatching shown in FIG. 11), and trimming processing which makes R, G and B signals of pixels outside the original-region "white" signals irrespective of input image signals is performed during reading scanning.

The trimming processing will now be described with reference to FIG. 8. The trimming processing is executed by causing $M_2$, $C_2$, $Y_2$ and $BK_2$ signals from the masking/UCR circuit 3016 to be gated by or to pass through an AND gate 3031. An effective-image-area signal is input from an AND gate 3030 to the AND gate 3031. The output of the masking/ UCP circuit 3016 is supplied or not supplied to the printer unit 200 when this signal assumes a high level or a low level, respectively.

Q outputs of flip-flop circuits 3028 and 3029 are input to the AND gate 3030, which outputs a high-level effective-image-area signal while both of these Q outputs assume a high level.

The outputs of comparators 3024 and 3025 are input to a J input terminal and a K input terminal of the flip-flop circuit 3028, respectively. Comparators 3024 and 3025 compare the coordinate values $X_2$ and $X_3$ sent by the CPU 3018 to A input terminals of comparators 3024 and 3025, respectively, with count values of the main-scanning address counter 351 input to the B input terminals. The Q output of the flip-flop circuit 3023 assumes a high level when the output of comparator 3024 indicates that the value $X_2$ input to the A input terminal of comparator 3024 equals the count value input to the B input terminal of the comparator 3024. Thereafter, the Q output of the flip-flop circuit 3028 assumes a low level when the output of comparator 3025 indicates that the value $X_3$ input to the A input terminal of comparator 3025 equals the count value input to the B input terminal of the comparator 3025.

The output of the comparator 3027 and the output of the comparator 3026 are input to a J input terminal and a K input terminal of the flip-flop circuit 3029, respectively. Comparators 3027 and 3026 compare the coordinate values $Y_1$ and $Y_4$ sent by the CPU 3018 to B input terminals of comparators 3027 and 3026, with the count value of the subscanning address counter 352 input to the B input terminals. The Q output of the flip-flop circuit 3029 assumes a high level when the output of comparator 3021 indicates that the value $Y_1$ input to the B input terminal of comparator 3027 equals the count value input to the A input terminal of the comparator 3027. Thereafter, the Q output of the flip-flop circuit 3029 assumes a low level when the output of comparator 3026 indicates that the value $Y_4$ input to the B input terminal of the comparator 3026 equals the count value input to the A input terminal of comparator 3026.

According to the above-described configuration, the CPU 3018 obtains the coordinate values of the four apices $P_1$–$P_4$ from the identification unit 1801 as a result of original-detection, and sets the coordinate values to the comparators 3024, 3025, 3027 and 3029, respectively. Thus, a high-level effective-image-area signal corresponding to a region surrounded by broken lines shown in FIG. 11 is output from the AND gate 3030 during reading scanning of the original, and trimming processing for the original-detection region is thereby executed.

When using a conventional mirror-finished original-pressing plate, the original-pressing plate effects regular reflection of visible light if, for example, an original is obliquely placed or binding holes are present in the original. As a result, the value of a light-amount signal from the original-pressing plate is reduced, and therefore portions of the original-pressing plate are recorded black. In the present embodiment, however, since an original-pressing plate which is white in the region of visible light is used, portions of the original-pressing plate are recorded white as in an ordinary case. Furthermore, by recognizing the coordinates of a rectangle indicated by the broken lines having coordinates $X_2$, $X_3$, $Y_1$ and $Y_4$ which surrounds the positions $P_1$–$P_4$ of the original, shown in FIG. 11, it is possible to perform processing, such as APS which automatically selects paper having the corresponding size, AMS which selects copying magnification, and the like. It is also possible to perform image shift of recording an image within the positions $P_1$–$P_4$ of the original while shifting it to a central portion or an end portion of recording paper.

Figure 13:
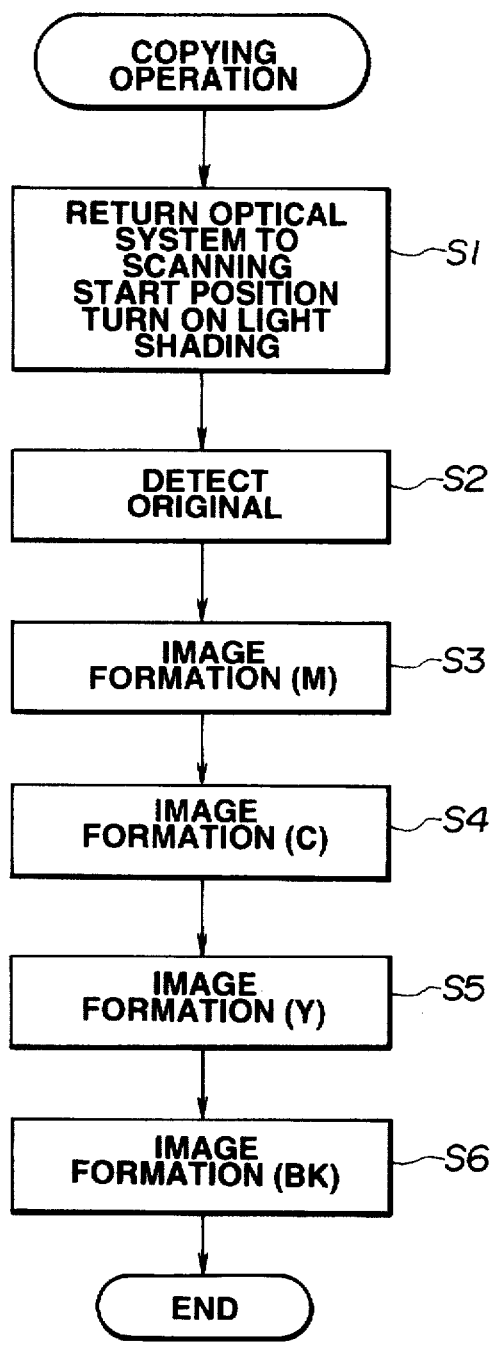
FIG. 13 is a flowchart of a procedure for operating the color copier of the first embodiment.

A description will now be provided of operation procedures of the color copier of the first embodiment with reference to the flowchart shown in FIG. 13.

First, when the operator has set the original 204 on the original-mount glass 203 and started a copying operation through an operation panel (not shown), the CPU 3018 moves the reflecting mirror 206 under the standard white plate 211 by controlling the motor 129 via the motor driver 3022. Thereafter, the CPU 3018 controls the lamp driver 3023 so as to light the halogen lamp 205 to illuminate the standard white plate 211, and the shading correction units 3006-3009 perform sampling of shading data for IR, R, G and B signals, respectively (step S1). Then, scanning for original-detection (prescanning) is performed in the above-described manner (step S2). Then, image recording is effected by performing four original-reading operations (reading scanning) in accordance with image recording operations for M, C, Y and SK colors by the printer unit 200. First, for magenta recording, the CPU 3018 sets processing conditions for magenta in the masking/UCR processing unit 3016, causes the optical system to perform scanning, and provides the printer unit 200 with a magenta signal. Upon completion of the scanning, the optical system is returned to the scanning start position (step S3). Similarly, recording control operations for cyan, yellow and black are performed in steps S4–S6, respectively. Then, the halogen lamp 205 is turned off, and the processing is terminated.

Figure 14:
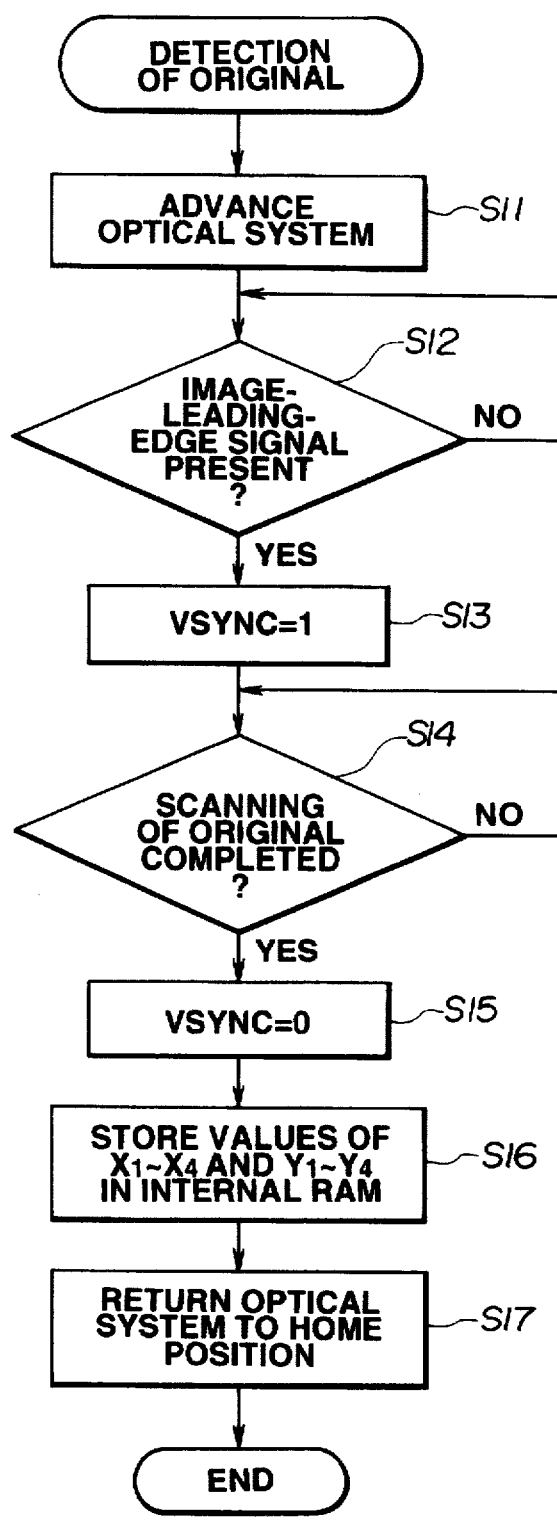
FIG. 14 is a flowchart of a procedure for detecting an original in the first embodiment.
Figure 15A:
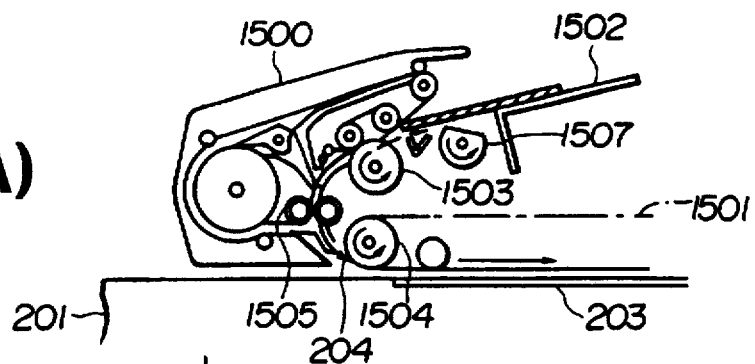
FIGS. 15(1)–15(4) are diagrams illustrating operations of an original-feeding device (DF) according to a second embodiment of the present invention.
Figure 15B:
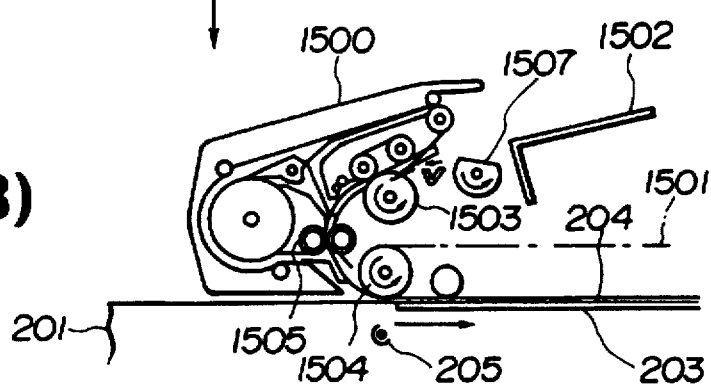
Figure 15C:
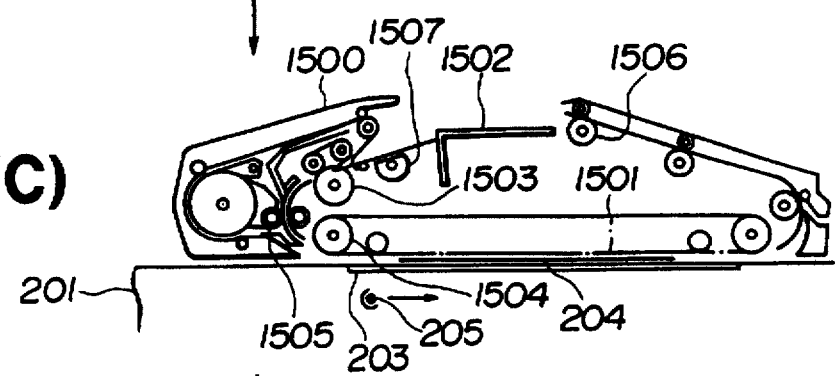
Figure 15D:
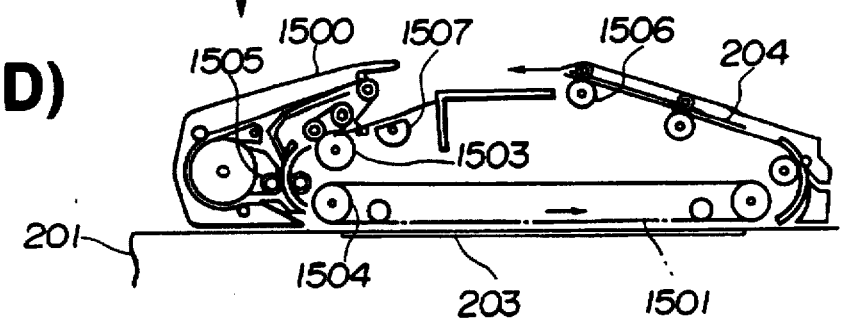

FIG. 14 is a flowchart illustrating processing procedures of the CPU 3018 in original-detection (step S2 shown in FIG. 13). First, in step S11, the optical system is advanced. Then, in step S12, an image-leading-edge signal is detected. If an image-leading-edge signal is present, the VSYNC signal- is made to be "1" in step S13. If an image-leading-edge signal is absent, the detection in step S12 is continued until an image-leading-edge signal appears. In step S14, it is determined if original-scanning has been completed. If the result of the determination is affirmative, the VSYNC signal is made to be "0" in step S15. If the result of the determination is negative, the original-scanning is continued, in step S16, the values of the coordinates $X_1$–$X_4$ and $Y_1$–$Y_4$ of the four apices of the original detected in the above-described procedures are stored in an internal RAM (not shown). In step S17, the optical system is returned to a home position. The image-leading-edge signal is a signal representing a start point of an image effective interval in the sub-scanning direction. The VSYNC signal, serving as an image-effective-interval in the sub-scanning direction, rises from "0" to "1" in response to this signal.

As described above, according to the first embodiment, it is possible to detect an original using infrared light by coating a substantially transparent infrared-absorbing material on a white original-pressing plate. Since the original-pressing plate is white in the range of visible light, it is not recorded black even if a portion of the plate is read.

Second Embodiment

In the first embodiment, a copier having a white original-pressing surface and capable of detecting an original has been described. In a second embodiment of the present invention, a description will be provided of an original feeding device (DF) having such an original-pressing plate and capable of detecting an original.

As described above, it is unnecessary to provide a mirror-finished original-pressing plate if an original is detected using infrared light. That is, it is unnecessary to use a mirror-finished surface which provides low original-feedability. Furthermore, since a substantially transparent infrared-absorbing material is coated on a white original-pressing plate, a white original-pressing surface may be used. Accordingly, it is possible to realize an original-feeding device (DF) having a white original-pressing surface and capable of performing original-detection which could not be realized when using visible light.

FIGS. 15(1) through 15(4) are diagrams illustrating operations of an original-feeding device (DF) according to the second embodiment. Since the operations of an original-feeding device are known and are apparent from FIGS. 15(1) through 15(4), only a brief description will be provided.

A DF 1500 is mounted on an image scanner unit 201 so as to be able to feed an original onto an original-mount glass 203. A plurality of sheets of originals are mounted on an original-tray 1502, and are fed by a sheet-feeding roller 1507 from the lowermost sheet. The fed original 204 is conveyed to a conveying belt 1501 by a conveying roller 1503 and registration rollers 1505 (see FIG. 15(1)). The conveying belt 1501 is moved in the direction of the arrow by a driving roller 1504, whereby the original 204 is conveyed to a predetermined position on the original-mount glass 203 (see FIG. 15(2)).

Thereafter, an optical system including a halogen lamp 205 moves in the direction of the arrow, and scanning for the original 204 is executed (see FIG. 15(3)). Upon completion of the original-scanning (including prescanning and reading scanning), the conveying belt 1501 is moved in the direction of the arrow by the driving roller 1504 to discharge the criminal 204 from the original-mount glass 203. The original 204 discharged from the original-mount glass 203 is discharged onto the original-tray 1502 by a discharging roller 1506.

In FIGS. 15(1) through 15(4), the conveying belt 1501 also operates as an original-pressing plate. In the present embodiment, the conveying belt 1501 is provided by coating a substantially transparent infrared-absorbing material on a white belt. Accordingly, as in the first embodiment, positions and the size of the original 204, which stops on the original-mount glass 203 after being conveyed thereto by the conveying belt 1501, are detected.

Figure 16:
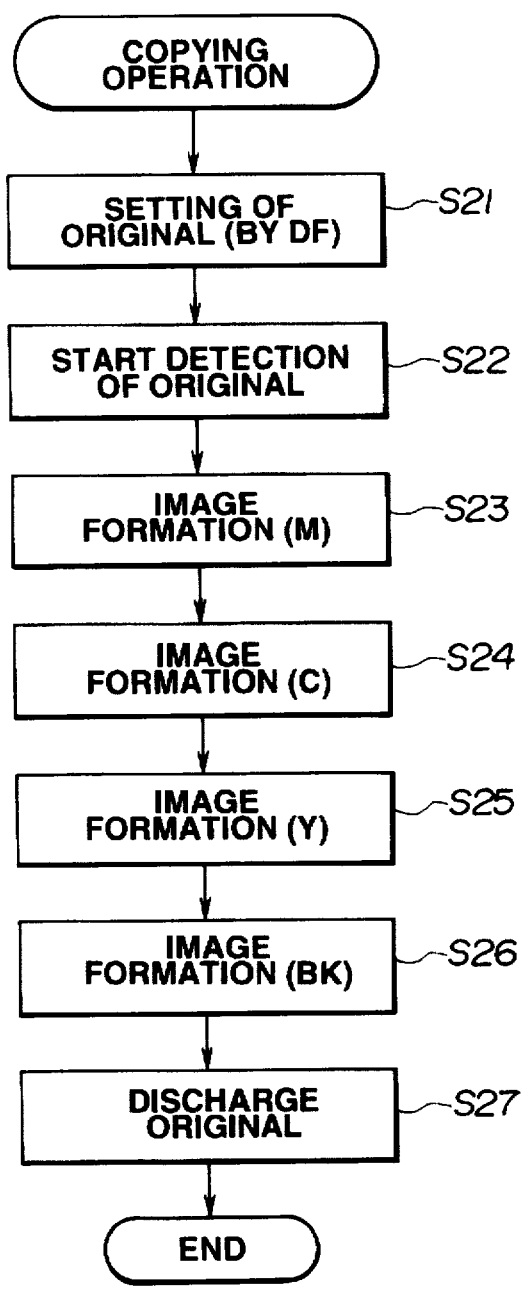
FIG. 16 is a flowchart of a procedure for performing a copying operation in the second embodiment.

FIG. 16 illustrates operation procedures in a copying operation in the second embodiment. As shown in FIG. 15(1), when the original 204 on the original-tray 1502 has been fed, the original-feeding device (DF) 1500 sets the original 204 on the original-mount glass 203 (step S21). After performing original-detection using infrared light in prescanning (step S22) and reading scanning of the original 204 in reading scanning (steps S23–S26), the original 204 on the original-mount glass 203 is conveyed, and is then discharged onto the original-tray 1502 (step S27).

Third Embodiment

In the above-described first and second embodiments, detection of an original is performed using infrared light. In a third embodiment of the present invention, an original is detected using both infrared light and visible light. In general, some green color materials used in images of originals have a property of absorbing infrared light. If such a green color material absorbing infrared light is used in an image of an original, detection of the original may, in some cases, be hindered. In order to overcome such a problem, in the third embodiment, visible light is used as well as infrared light as illuminating light for detecting an original. Accordingly, in the third embodiment, the presence of an original is recognized in an infrared-reflecting region (a region where such a color material is not used in the original) or in a region where green is detected (a region where this color material is used in the original).

A method for detecting an original according to the third embodiment will now be described with reference to FIGS. 17 and 18.

Figure 17:
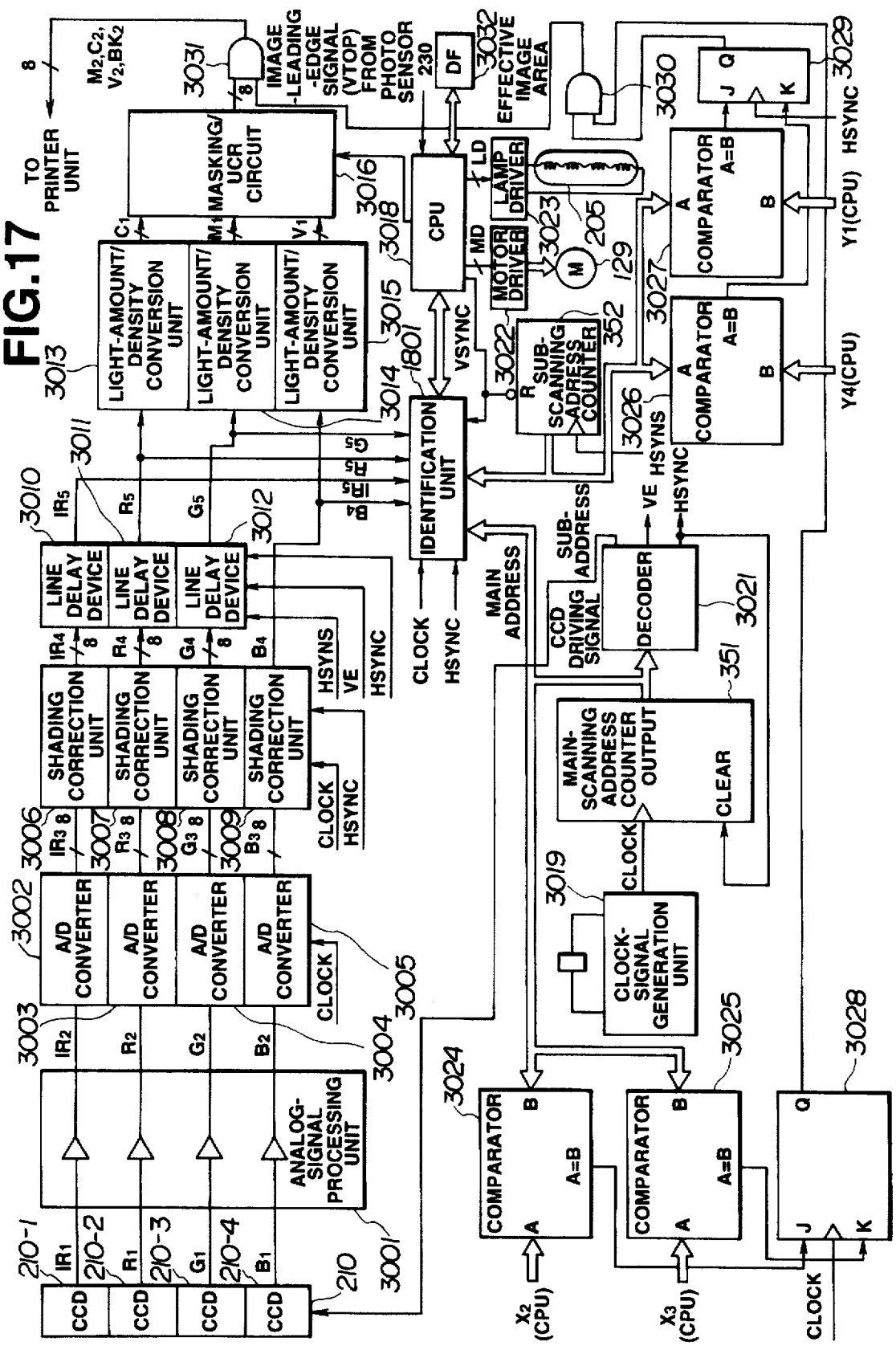
FIG. 17 is a block diagram illustrating the configuration of control in an image scanner unit according to a third embodiment of the present invention.

FIG. 17 is a block diagram illustrating the configuration of control in an image scanner unit 201 of the third embodiment. Components having the same configuration of control as in the first embodiment (shown in FIG. 8) are indicated by the same reference numerals, and detailed description thereof will be omitted.

As shown in FIG. 17, image signals $IP_1$, $R_1$, $G_1$ and $B_1$ output from the CCD 210 are input -to an analog-signal processing unit 3001, and is subjected to gain adjustment and offset adjustment. Thereafter, color signals $IR_2$, $R_2$, $G_2$ and $B_2$ are converted into 8-bit digital image signals by A/D converters 3002–3005, respectively. The digital image signals are input to shading correction units 3006–3009, and are subjected to known shading correction using a read signal obtained from the standard white plate 211 for respective color signals $IR_3$, $R_3$, $G_3$ and $B_3$. Line delay devices 3010, 3011 and 3012 correct spatial deviation in the sub-scanning direction. Signals $R_5$, $G_5$ and $B_4$ after the correction are input to an identification unit 1801 for original-detection.

Figure 18:
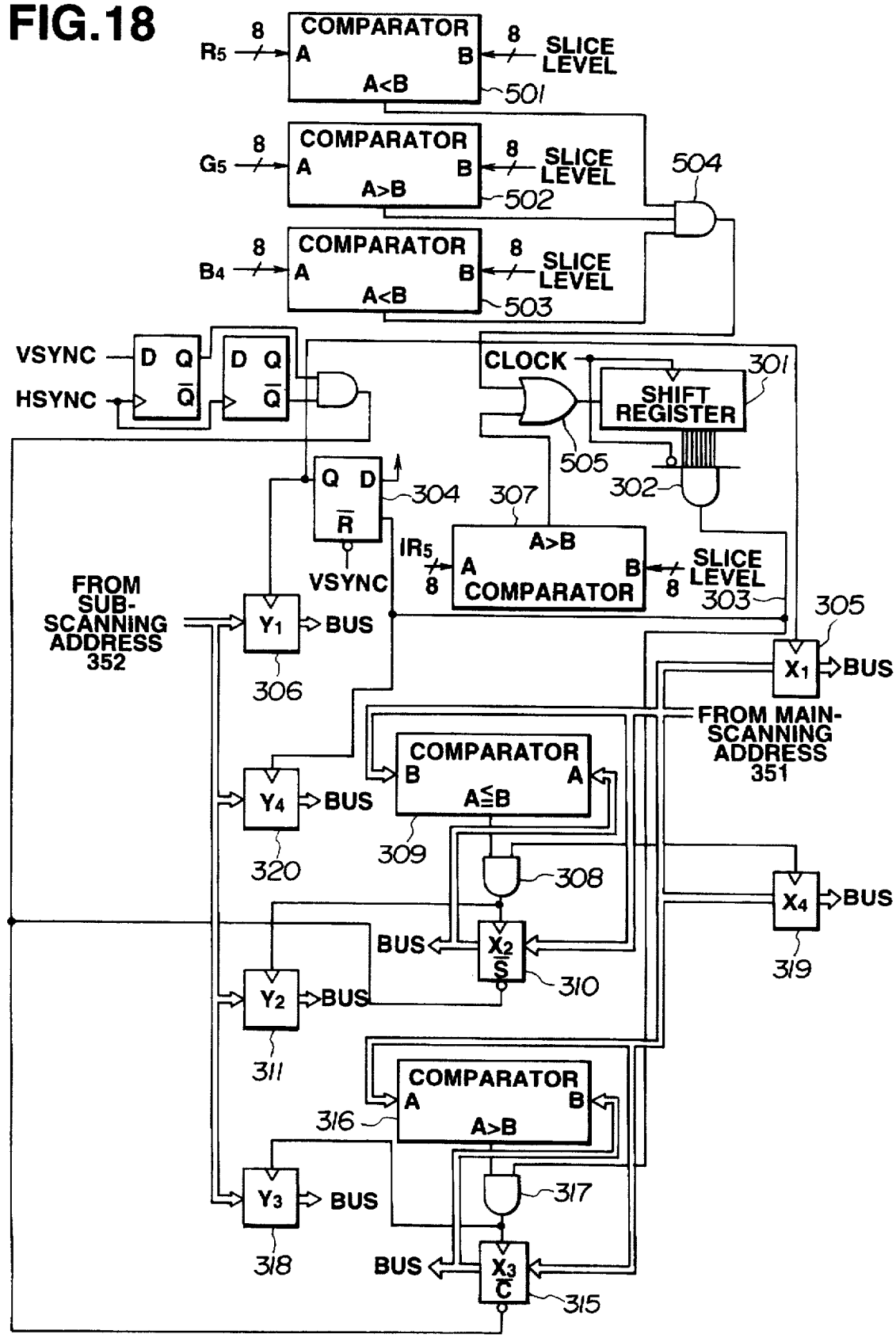
FIG. 18 is a block diagram illustrating an example of the configuration of circuitry of a recognition unit of the second embodiment.

Next, a description will be provided of the identification unit 1801 with reference to FIG. 18. FIG. 18 is a block diagram illustrating an example of the configuration of circuitry of the identification unit 1080 of the third embodiment. Components having the same configuration as those of the identification unit of the first embodiment (shown in FIG. 12) are indicated by the same reference numerals, and detailed description thereof will be omitted.

Reflected light from a green portion within the original provides small R and B signals, but provides a large G signal. As shown in FIG. 18, in the identification unit 1801, comparators 501–503 compare the $R_5$, $G_5$ and $B_4$ signals with predetermined slice levels, respectively. The comparators 501 and 503 for performing comparison of the $R_5$ and $B_4$ signals output a signal "1" to an AND gate 504 when the $R_5$ and $B_4$ signals are smaller than the slice levels, respectively. The comparator 502 for performing comparison of the $G_5$ signal outputs a signal "1" when the $G_5$ signal is greater than the slice level. When the $R_5$ and $B_4$ signals are small and the $G_5$ signal is large, i.e., when all of the comparators 501–503 output a signal "1" to the AND gate 504, it is recognized that a green color material is used within the original, and the AND gate 504 outputs a signal "1" to an OR gate 505. Also when an infrared signal $IR_5$ is greater than a predetermined slice level, a signal "1" is output from a comparator 307, and is input to the OR gate 505.

When a green color has been detected within the original or when infrared light is input in the above-described manner, the OR gate 505 outputs a signal "1" to a shift register 301, and thus the original is detected. Since detection of the coordinates of positions of the original is the same as in the first embodiment (see FIG. 12), description thereof will be omitted. By using infrared light and visible light as described above, it is possible to detect even a particular original.

Although in the above-described embodiments, an original-pressing plate using an infrared-absorbing material is used, a conventional mirror-finished original-pressing plate may also be used. Even if infrared light is used as illuminating light for original-detection in the above-described manner, the light is subjected to irregular reflection by a portion of an original, and therefore reflected light is guided to a photosensor. On the other hand, the light is subjected to regular reflection by a portion of an original-pressing plate, and therefore reflected light does not reach the photosensor. As a result, a region where the infrared light is reflected and reaches the photosensor is detected as a portion of the original.

Although in the foregoing embodiments, a description has been provided illustrating infrared optical information, the present invention is not limited to infrared light, but may also use ultraviolet light.

As described above, according to the above-described embodiments, when detecting the coordinates of edge points of an original, invisible light is detected, and the presence of the original is recognized when the invisible light having a specific level indicating that the original is being scanned is continuously output for a predetermined number of pixels. At that time, the coordinates of boundary portions between an original-pressing plate and the original are detected based on the state of changes in the result of the determination and scanning addresses, and the size and the mounted positions of the original are recognized based on the detected coordinates. Accordingly, visual characteristics of an original-pressing plate, such as the color of an original-pressing member and the like, can be freely set, and an original can be detected with high accuracy.

According to the third embodiment, by also using visual light as illuminating light, even a particular original having a color material which absorbs infrared light can also be detected.

The present invention may be applied to a system comprising a plurality of apparatuses, or to an apparatus comprising a single unit. The present invention may, of course, be applied to a case in which the objects of the invention are achieved by supplying a system or an apparatus with programs.

As described above, it is possible to detect an original using light of an invisible region, and to freely set visual characteristics (the color and the like) of an original-pressing plate.

In addition, an original-pressing plate can be used also as a conveying belt by detecting an original using light of an invisible region.

The individual components shown in outline or designated by blocks in the drawings are all well known in the original-detection and original-processing arts and their specific construction and operation are not critical to the operation or the best mode for carrying out the invention.

While the present invention has been described with respect to what is presently considered to be the preferred embodiments, it is understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An original detection device comprising:
   an original-mount on which an original is mounted;
   pressing means having an original-pressing surface for pressing the original on said original-mount;
   absorption means, provided on the original-pressing surface of said pressing means, for absorbing light of a predetermined wavelength region within an invisible region;
   illuminating means for illuminating the original mounted on said original-mount and the original-pressing surface of said pressing means through said original-mount with light including the light of the predetermined wavelength region;
   sensing means for sensing the light of the predetermined wavelength region of reflected light from the original and the original-pressing surface illuminated by said illuminating means; and
   detection means for detecting the position of the original on said original-mount based on an output from said sensing means.

2. An original-detection device according to claim 1, wherein the detection of the position of the original by said detection means is executed over the entire surface of said original-mount.

3. An original-detection device according to claim 1, wherein said detection means comprises position detection means for detecting positions of vertices of the original on said original-mount based on the output from said sensing means.

4. An original-detection device according to claim 3, further comprising size recognition means for recognizing a size of the original based on positions of vertexes of the original detected by said position detection means.

5. An original-detection device according to claim 1, wherein said sensing means comprises a filter for transmitting the light of the predetermined wavelength region and a photosensor for sensing the light transmitted through said filter.

6. An original-detection device according to claim 5, wherein said filter is provided on said photosensor.

7. An original-detection device according to claim 1, wherein the light of the predetermined wavelength region comprises light of an infrared region.

8. An original-detection device according to claim 7, wherein said filter transmits the light of the infrared region.

9. An original-detection device according to claim 1, wherein said absorption means is a substantially transparent infrared-absorbing material coated on the original-pressing surface of said pressing means.

10. An original-detection device according to claim 1, wherein said pressing means comprises conveying means for conveying the original onto said original-mount.

11. An original-detection device according to claim 1, wherein said pressing means conveys the original onto the original-mount.

12. An original-processing device comprising:

an original-mount on which an original is mounted;

pressing means having an original-pressing surface for pressing the original on said original-mount;

absorption means, provided on the original-pressing surface of said pressing means, for absorbing light of a predetermined wavelength region within an invisible region;

illuminating means for illuminating the original mounted on said original-mount and the original-pressing surface of said pressing means through said original-mount with light including light of the predetermined wavelength region;

sensing means for sensing light of the predetermined wavelength region of reflected light from the original and the original-pressing surface illuminated by said illuminating means;

detection means for detecting a position of the original on said original-mount based on an output from said sensing means; and processing means for processing an image of the original mounted based on the position of the original on said original-mount detected by said detecting means.

13. An original-processing device according to claim 12, wherein the detection of the position of the original by said detection means is executed over an entire surface of said original-mount.

14. An original-processing device according to claim 12, wherein said detection means comprises position detection means for detecting positions of vertices of the original on said original-mount based on the output from said sensing means.

15. An original-processing device according to claim 14, further comprising size recognition means for recognizing a size of the original based on positions of vertices of the original detected by said position detection means.

16. An original-processing device according to claim 12, wherein said processing means extracts an image of the original based on a position of the original detected by said detecting means.

17. An original-processing device according to claim 12, wherein said sensing means comprises a filter for transmitting the light of the predetermined wavelength region and a photosensor for sensing the light transmitted through said filter.

18. An original-processing device according to claim 17, wherein said filter is provided on said photosensor.

19. An original-processing device according to claim 12, wherein the light of the predetermined wavelength region comprises light of an infrared region.

20. An original-processing device according to claim 19, wherein said filter transmits the light of an infrared region.

21. Am original-processing device according to claim 12, wherein said absorption means is a substantially transparent infrared-absorbing material coated on the original-pressing surface of said pressing means.

22. An original-processing device according to claim 12, wherein said pressing means comprises conveying means for conveying the original onto said original-mount.

23. An original-processing device according to claim 12, wherein said pressing means conveys the original onto the original-mount.

* * * * *

UNITED STATES PATENT AND TRADEMARK OFFICE
CERTIFICATE OF CORRECTION

PATENT NO. : 5,764,380

DATED : June 9, 1998

INVENTOR(S) : JUNICHI NOGUCHI

It is certified that error appears in the above-identified patent and that said Letters Patent is hereby corrected as shown below:

COLUMN 5:

Line 27 "directions" should read --direction--.

COLUMN 6:

Line 29, "parallel," should read --parallel--.

COLUMN 7:

Line 13, "in.FIG. 4" should read --in FIG. 4--.

COLUMN 10:

Line 44, "staring" should read --starting--.
Line 66, "3511" should read --351--.

COLUMN 12:

Line 3, "3023" should read --3028--.

UNITED STATES PATENT AND TRADEMARK OFFICE
CERTIFICATE OF CORRECTION

PATENT NO. : 5,764,380

DATED : June 9, 1998

INVENTOR(S) : JUNICHI NOGUCHI

It is certified that error appears in the above-identified patent and that said Letters Patent is hereby corrected as shown below:

COLUMN 13:

Line 8, "SK" should read --BK--.
  Line 23, "signal-" should read --signal--.
  Line 29, "continued, in" should read --continued. In--.

COLUMN 14:

Line 67, "-to" should read --to--.

COLUMN 15:

Line 15, "1080" should read --1081--.

COLUMN 18:

Line 38, "Am" should read --An--.

Signed and Sealed this

Second Day of February, 1999

Attest:

Attesting Officer

*Acting Commissioner of Patents and Trademarks*